(12) United States Patent
Kokemohr

(10) Patent No.: US 7,602,991 B2
(45) Date of Patent: *Oct. 13, 2009

(54) USER DEFINABLE IMAGE REFERENCE REGIONS

(75) Inventor: Nils Kokemohr, Hamburg (DE)

(73) Assignee: Nik Software, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/832,599

(22) Filed: Aug. 1, 2007

(65) Prior Publication Data

US 2008/0137952 A1 Jun. 12, 2008

Related U.S. Application Data

(60) Continuation-in-part of application No. 11/279,958, filed on Apr. 17, 2006, which is a continuation of application No. 11/072,609, filed on Mar. 3, 2005, now Pat. No. 7,031,547, which is a continuation of application No. 10/824,664, filed on Apr. 13, 2004, now Pat. No. 6,865,300, which is a division of application No. 10/280,897, filed on Oct. 24, 2002, now Pat. No. 6,728,421.

(60) Provisional application No. 60/336,498, filed on Oct. 24, 2001, provisional application No. 60/821,120, filed on Aug. 1, 2006.

(51) Int. Cl.
*G06K 9/40* (2006.01)
*G06T 15/00* (2006.01)
*G06K 9/36* (2006.01)

(52) U.S. Cl. ............... 382/260; 382/284; 345/619

(58) Field of Classification Search ........... 382/113, 382/131, 162, 165, 214, 219, 220, 221, 254, 382/260, 263, 284; 345/619, 620, 629, 630, 345/639, 650, 671; 358/1.9, 296, 401, 443, 358/448, 450; 707/104.1; 709/221; 715/814
See application file for complete search history.

(56) References Cited

U.S. PATENT DOCUMENTS 5,506,946 A 4/1996 Bar et al.

(Continued)

FOREIGN PATENT DOCUMENTS

EP 0 886 437 A2 12/1998

(Continued)

OTHER PUBLICATIONS

Chiyo Date et al., Sentakuhanni-hen, Mac Fan Special 14, Feb. 22, 2001, pp. 51-70, Mainichi Communications, Japan.

*Primary Examiner*—Amir Alavi
(74) *Attorney, Agent, or Firm*—Sheldon Mak Rose & Anderson PC; Robert J. Rose

(57) ABSTRACT

A method for image processing of a digital image, in which a region of interest is defined in the digital image, one or more sets of pixel characteristics are determined for the region of interest, along with an image editing function, and the digital image is processed by applying a mixing function algorithm based on the one or more sets of pixel characteristics and the determined image editing function. When the digital image includes pixels that are outside of the region of interest, the processing the digital image includes using the mixing function to determine which pixels that are outside of the region of interest are affected by the image editing function.

34 Claims, 12 Drawing Sheets

U.S. PATENT DOCUMENTS

| | | | |
|---|---|---|---|
| 5,638,496 A | 6/1997 | Sato | |
| 6,175,663 B1 | 1/2001 | Huang | |
| 6,229,544 B1 * | 5/2001 | Cragun | 345/418 |
| 6,301,586 B1 * | 10/2001 | Yang et al. | 707/104.1 |
| 6,335,733 B1 * | 1/2002 | Keren et al. | 345/418 |
| 6,466,228 B1 * | 10/2002 | Ulrich et al. | 345/619 |
| 6,480,203 B1 * | 11/2002 | Carter et al. | 345/619 |
| 6,535,301 B1 | 3/2003 | Kuwata et al. | |
| 6,710,782 B2 * | 3/2004 | Ruff et al. | 345/619 |
| 6,728,421 B2 * | 4/2004 | Kokemohr | 382/284 |
| 6,865,300 B2 * | 3/2005 | Kokemohr | 382/260 |
| 6,941,359 B1 * | 9/2005 | Beaudoin et al. | 709/221 |
| 7,013,028 B2 * | 3/2006 | Gont et al. | 382/113 |
| 7,031,547 B2 * | 4/2006 | Kokemohr | 382/260 |
| 2003/0095697 A1 * | 5/2003 | Wood et al. | 382/131 |

FOREIGN PATENT DOCUMENTS

| | | |
|---|---|---|
| JP | 7-162677 A | 6/1995 |
| JP | 10-091761 A | 4/1998 |
| JP | 11-146219 A | 5/1999 |
| JP | 2000-151985 A | 5/2000 |
| JP | 2001-67469 A | 3/2001 |

* cited by examiner

801

802

803

804

805

806

807

808

817

818

819

820

821

822

823

824

USER DEFINABLE IMAGE REFERENCE REGIONS

CROSS-REFERENCE TO RELATED APPLICATIONS

The present Application claims the benefit of U.S. Provisional Patent Application No. 60/821,120 titled "User Definable Image Reference Regions" filed Aug. 1, 2006, and is a continuation in part of U.S. patent application Ser. No. 11/279,958, now pending, which is a continuation of U.S. patent application Ser. No. 11/072,609, now U.S. Pat. No. 7,031,547, titled "User Definable Image Reference Points", which is a continuation of U.S. patent application Ser. No. 10/824,664, filed Apr. 13, 2004, now U.S. Pat. No. 6,865,300, which is a division of U.S. patent application Ser. No. 10/280,897, filed Oct. 24, 2002, now U.S. Pat. No. 6,728,421, which claims the benefit of U.S. Provisional Patent Application No. 60/336,498 titled "User Definable Image Reference Points" filed Oct. 24, 2001, the content of which are incorporated by reference in this disclosure in their entirety.

BACKGROUND

The present invention relates to an application program interface and methods for combining any number of arbitrarily selected image modifications in an image while assigning those modifications easily to an image area and/or image color to provide for optimally adjusting color, contrast, sharpness, and other image-editing functions in the image-editing process.

The present application is an extension of User Definable Image Reference Points to regions, which may be termed User Definable Image Reference Regions. User Definable Image Reference Points are described in U.S. Pat. Nos. 7,031,547; 6,865,300; and 6,728,421, the content of which are incorporated by reference in this disclosure in their entirety.

It is a well-known problem to correct color, contrast, sharpness, or other specific digital image attributes in a digital image. It is also well-known to those skilled in image-editing that it is difficult to perform multiple color, contrast, and other adjustments while maintaining a natural appearance of the digital image.

At the current stage of image-editing technology, computer users can only apply relatively basic functions to images in a single action, such as increasing the saturation of all pixels of an image, removing a certain colorcast from the entire image, or increasing the image's overall contrast. Well-known image-editing tools and techniques such as layer masks can be combined with existing image adjustment functions to apply such image changes selectively. However, current methods for image editing are still limited to one single image adjustment at a time. More complex tools such as the Curves functions provided in image editing programs such as Adobe Photoshop® provide the user with added control for changing image color, but such tools are difficult to apply, and still very limited as they apply an image enhancement globally to the image.

Additional image editing tools also exist for reading or measuring color values in the digital image. In its current release, Adobe Photoshop® offers a feature that enables the user to place and move up to four color reference points in an image. Such color reference points read properties (limited to the color values) of the image area in which they are placed. It is known to those skilled in the art that the only purpose of such color reference points is to display the associated color values; there is no image operation associated with such reference points. The reference points utilized in image-editing software are merely offered as a control tool for measuring an image's color values at a specific point within the image.

In other implementations of reference points used for measuring color in specific image regions, image-editing applications such as Adobe Photoshop®, Corel Draw®, and Pictographics iCorrect 3.0®, allow the user to select a color in the image by clicking on a specific image point during a color enhancement and perform an operation on the specific color with which the selected point is associated. For example, the black-point adjustment in Adobe Photoshop® allows the user to select a color in the image and specify the selected color as black, instructing the software to apply a uniform color operation to all pixels of the image, so that the desired color is turned into black. This method is not only available for black-point operations, but for pixels that are intended to be white, gray (neutral), skin tone, or sky, etc.

While each of these software applications provide methods for reading a limited number of colors and allow for one single operation which is applied globally and uniformly to the image and which only applies one uniform color cast change based on the read information, none of the methods currently used allow for the placement of one or more graphical representations of image reference points (IRPs) in the image that can read color or image information, be assigned an image editing function, be associated with one or more image reference points (IRPs) in the image to perform image-editing functions, be moved, or be modified by the user such that multiple related and unrelated operations can be performed.

What is needed is a graphic user interface and methods for editing digital images that enable the user to place multiple, arbitrary reference points in a digital image and assign image-editing functions, weighted values or any such combinations to enable multiple image-editing functions to be applied to an image. Further, what is needed is an extension of this method to regions.

SUMMARY

A method is disclosed for image processing of a digital image, in which a region of interest is defined in the digital image, one or more sets of pixel characteristics are determined for the region of interest, along with an image editing function, and the digital image is processed by applying a mixing function algorithm based on the one or more sets of pixel characteristics and the determined image editing function. When the digital image includes pixels that are outside of the region of interest, the processing the digital image includes using the mixing function to determine which pixels that are outside of the region of interest are affected by the image editing function.

Many variations are possible. Pixels that are outside of the region of interest and which are spatially and colormetrically more similar to the pixels in the region of interest may be affected to a greater extent by the determined image editing function. An out-painting routine may be used on pixels that are outside of the region of interest. The image editing function could be selected from the group consisting of a darkening function, a brightening function, and a saturation altering function, among many other possibilities.

In one embodiment, a matrix that includes a plurality of spatial distances and a plurality of pixel characteristic differences is created, each of the plurality of spatial distances is a spatial distance between a pixel that is outside of the region of interest and the region of interest, and each of the plurality of pixel characteristic differences is a difference in pixel characteristic between a pixel that is outside of the region of interest and the region of interest.

The region of interest may be associated with the coordinates of the one or more defined image reference points.

A control element can be associated with the region of interest. Such a control element could be selected, for example, from the group consisting of a slider, a button, a checkbox, a text-entry field, a lasso tool, a brush, and a curve. There are other possible control elements. A floating text element could be associated with the control element, and it could include, for example, information selected from the group consisting of a purpose of the control element and a value of the control element. The location of the control element could be definable by a user, or a computer program. For example, it could be adjacent to the side of the digital image, or in a window other than the window in which the digital image is located. The control element can be visually associated with the region of interest using an identifier such as an icon, a number, or a highlighted region on the digital image.

If the user has not defined the region of interest to have a closed shape, one or more lines can be added to the user-defined region of interest so the region of interest has a closed shape. The shape of the region of interest can be at least partially defined by the digital image's margin. The shape of the region of interest can be changed after the region of interest is defined.

A brush stroke that is applied to the digital image could be used to define the region. An effect radius can be used that extends away from the region of interest, and which forms a radius effect shape as a result of the shape of the region of interest. The radius effect shape can be further defined by a second line on the digital image that shows where an effect that is associated with the effect radius drops below a predetermined value. A user can change the effect radius.

A local statistic such as a histogram, an average value, or a variance, based on the pixels that are included in the region of interest can be derived, and displayed on the monitor for viewing by a user. An interface can allow a user to modify the local statistic resulting in a modification of the pixel characteristics for pixels in the digital image.

A computer program can be configured to define the region of interest based on a determination of a region of pixels in the digital image that have characteristics that are similar to a pixel in the digital image that is selected by a user.

Variations are also possible when two separate regions of interest in the digital image are defined. A user could subdivide the digital image into two or more regions of interest, and assign a control element to one or more of the regions of interest. Two or more regions of interest that are adjacent to one another in the digital image can be defined, where a smooth transition exists between the pixel characteristic for pixels in the digital image that are located near the two or more adjacent regions of interest. Each of two or more regions of interest can have associated with it a control element, and the control element can be configured to allow a user to remove the region of interest that is associated with the control element from the step of processing the digital image.

The image editing function can have an effect strength value, a mask can be configured to determine the effect strength value, the mask could include a local maxima, and the local maxima can be removed from the mask, either by automatic process, or by user intervention.

Two or more regions of interest may be distinguishable to a user because each of the two or more regions of interest has a unique identifier such as a color or a line style. The unique identifier could be chosen by a user, or defined automatically based on the type of image editing function that is performed on the region of interest.

The region of interest could be defined by a line.

Numerous embodiments of mixing function algorithms are described, including a Pythagoras distance approach that calculates a geometric, a color curves approach, a segmentation approach, a classification approach, a expanding areas approach, and an offset vector approach.

Numerous embodiments of a graphic user interface are described, including a first interface that is configured to receive coordinates of one or more regions of interest within the digital image, and a second interface that is configured to receive an image editing function that is associated with either the coordinates of each of the one or more regions of interest, or image characteristics of one or more pixels neighboring the one or more regions of interest.

BRIEF DESCRIPTION OF THE DRAWINGS

These and other features, aspects, and advantages of the present invention will become better understood with reference to the following description, illustrations, equations, appended claims, and accompanying drawings where:

DETAILED DESCRIPTION

The method and program interface of the present invention is useable as a plug-in supplemental program, as an independent module that may be integrated into any commercially available image processing program such as Adobe Photoshop®, or into any image processing device that is capable of modifying and displaying an image, such as a color copier or a self service photo print kiosk, as a dynamic library file or similar module that may be implemented into other software programs whereby image measurement and modification may be useful, or as a stand alone software program. These are all examples, without limitation, of image processing of a digital image. Although embodiments of the invention which adjust color, contrast, noise reduction, and sharpening are described, the present invention is useful for altering any attribute or feature of the digital image.

Furthermore, it will become clear with regard to the current invention that the user interface for the current invention may have various embodiments, which will become clear later in this disclosure.

The Application Program Interface

The user interface component of the present invention provides methods for setting IRPs in an image. Those skilled in the art will find that multiple methods or implementations of a user interface are useful with regard to the current invention.

Figure 1:
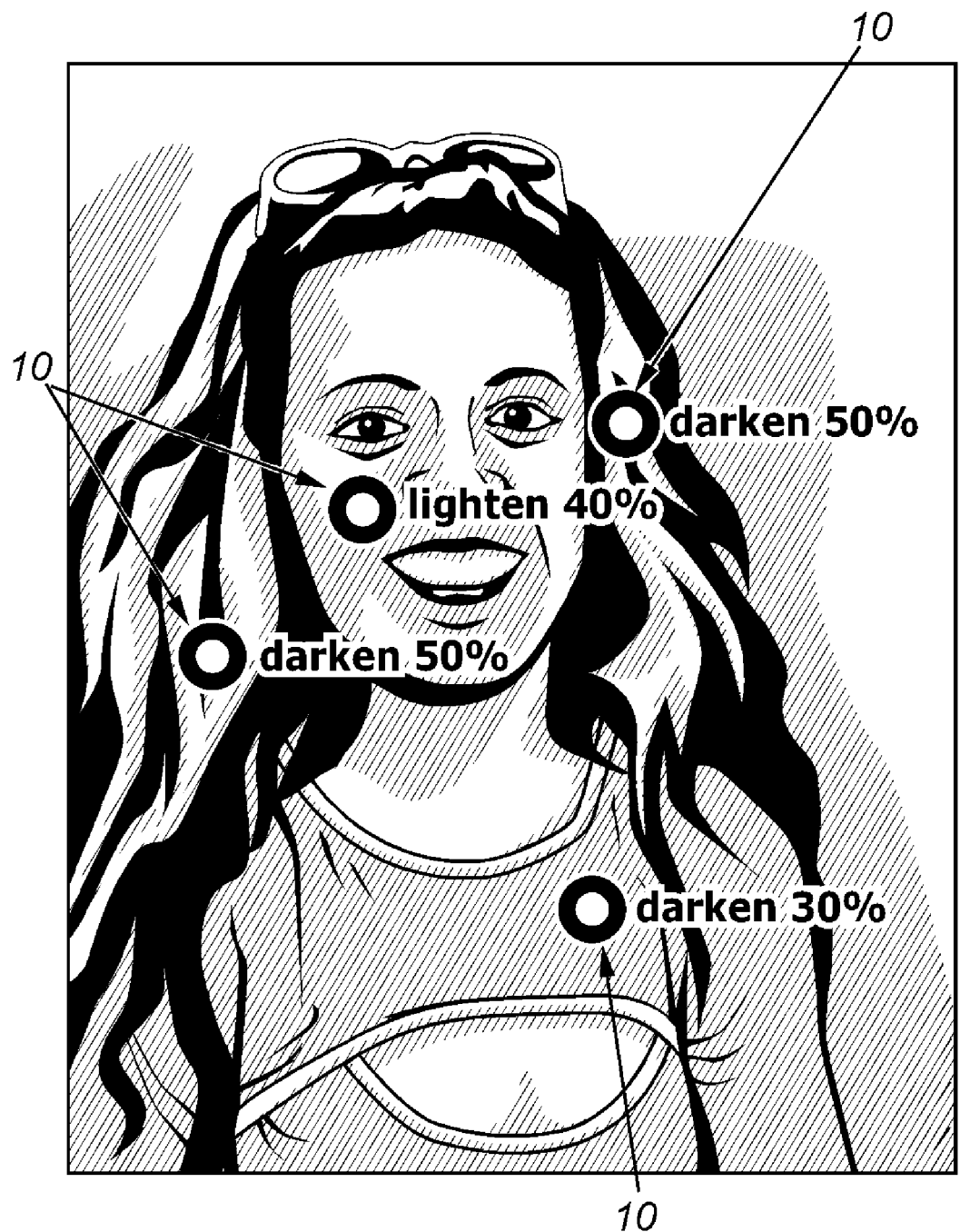
FIG. 1 is a screen shot of a digital image in an image processing program, illustrating one embodiment useable in the application program interface of the present invention.

In one preferred embodiment of a user interface, an implementation of the present invention allows the user to set a variety of types of IRPs in an image, which can be shown as graphic tags 10 floating over the image, as shown in FIG. 1. FIG. 1 is a screen shot of a digital image in an image processing program.

This method enables the user to move the IRPs in the image for the purpose of adjusting the location of such IRPs and thus the effect of each IRP on the image.

Figure 2:
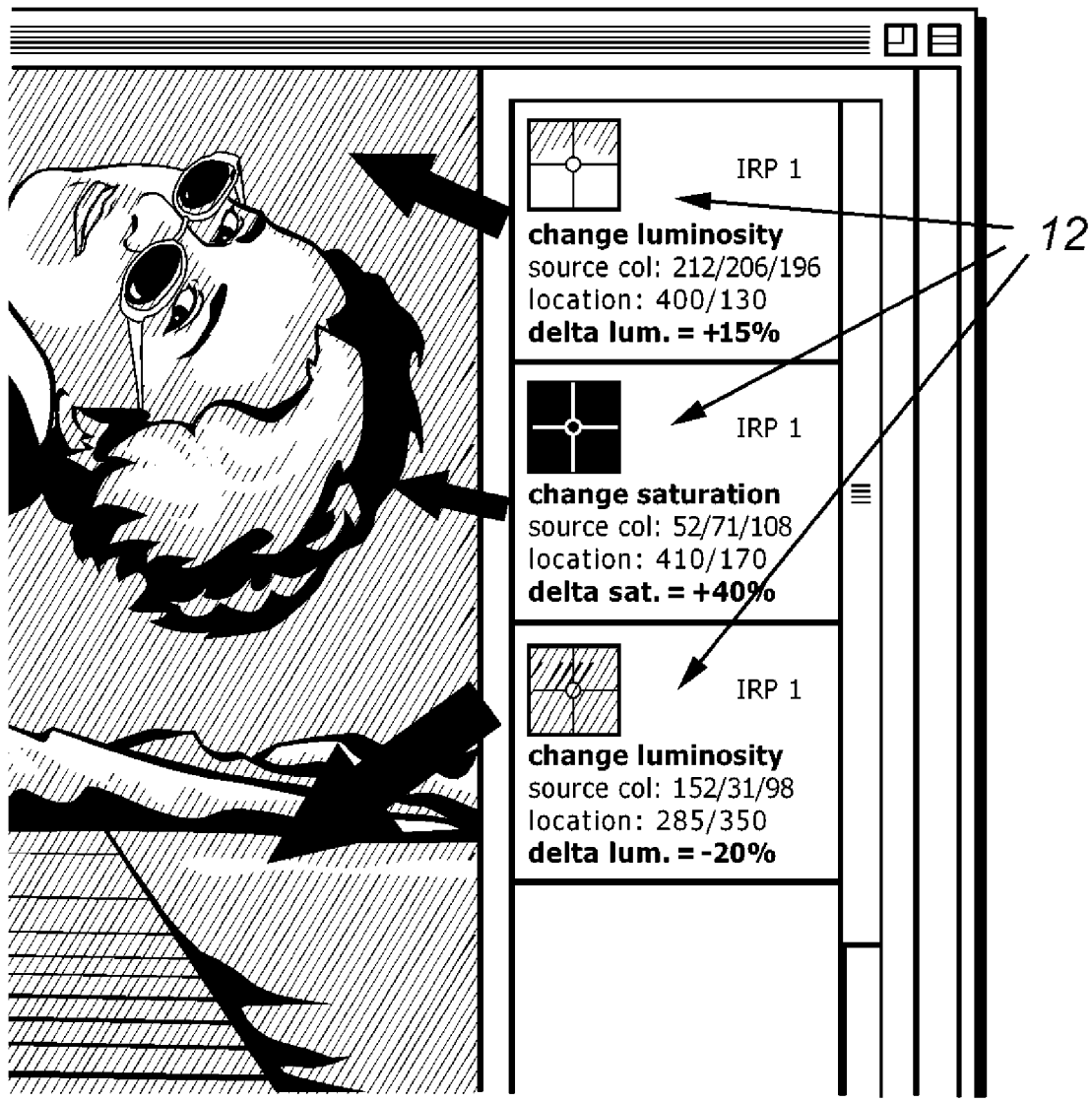
FIG. 2 is a screen shot of a digital image in an image processing program, illustrating another embodiment useable in the application program interface of the present invention.

In another preferred embodiment, IRPs could be invisible within the preview area of the image and identified placed elsewhere as information boxes 12 within the interface, as shown in FIG. 2, but associated with a location (shown by arrow). In this embodiment of the user interface, graphic tags 10 do not "float" over the image as in FIG. 1. However, as it will become clear later in this disclosure that it is the location that Image Reference Points [IRPs] identifies and the related function that are significant, and that the graphical representations of the IRPs are useful as a convenience to the user to indicate the location of the IRP function. (FIG. 2 is a screen shot of a digital image in an image processing program.)

In both FIG. 1 and FIG. 2, the IRPs serve as a graphical representation of an image modification that will be applied to an area of the image.

The application program interface is embodied on a computer-readable medium for execution on a computer for image processing of a digital image. A first interface receives the coordinates of each of a plurality of image reference points defined by a user within the digital image, and a second interface receives an image editing function assigned by the user and associated with either the coordinates of each of the plurality of defined image reference points, or the image characteristics of one or more pixels neighboring the coordinates of each of the plurality of defined image reference points.

In a further embodiment, the second interface receives an image editing function assigned by the user and associated with both the coordinates of each of the plurality of defined image reference points, and the image characteristics of one or more pixels neighboring the coordinates of each of the plurality of defined image reference points.

In a further alternative optional embodiment, a third interface displays a graphical icon or graphical tag 10 at the coordinates of one or more than one of the plurality of defined image reference points. Additionally optionally, the third interface permits repositioning of the graphical icon.

In further embodiments, a fourth interface displays the assigned image editing function. The second interface may further receive an image area associated with the coordinates of one or more than one of the plurality of defined image reference points. The second interface may further receive a color area associated with the coordinates of one or more than one of the plurality of defined image reference points.

In an alternative embodiment, the first interface receives the coordinates of a single image reference point defined by a user within the digital image, and the second interface receives an image editing function assigned by the user and associated with both the coordinates of the defined image reference point, and the image characteristics of one or more pixels neighboring the coordinates of the defined image reference point.

Mixing Functions

A central function of the present invention is the "Mixing Function," which modifies the image based on the values and settings of the IRPs and the image modifications associated with the IRPs. With reference to this disclosure, a "Mixing Function" is an algorithm that defines to what extent a pixel is modified by each of the IRPs and its related image modification function.

It will be evident to those skilled in the art that there are many possible mixing functions, as will be shown in this disclosure.

Figure 3:
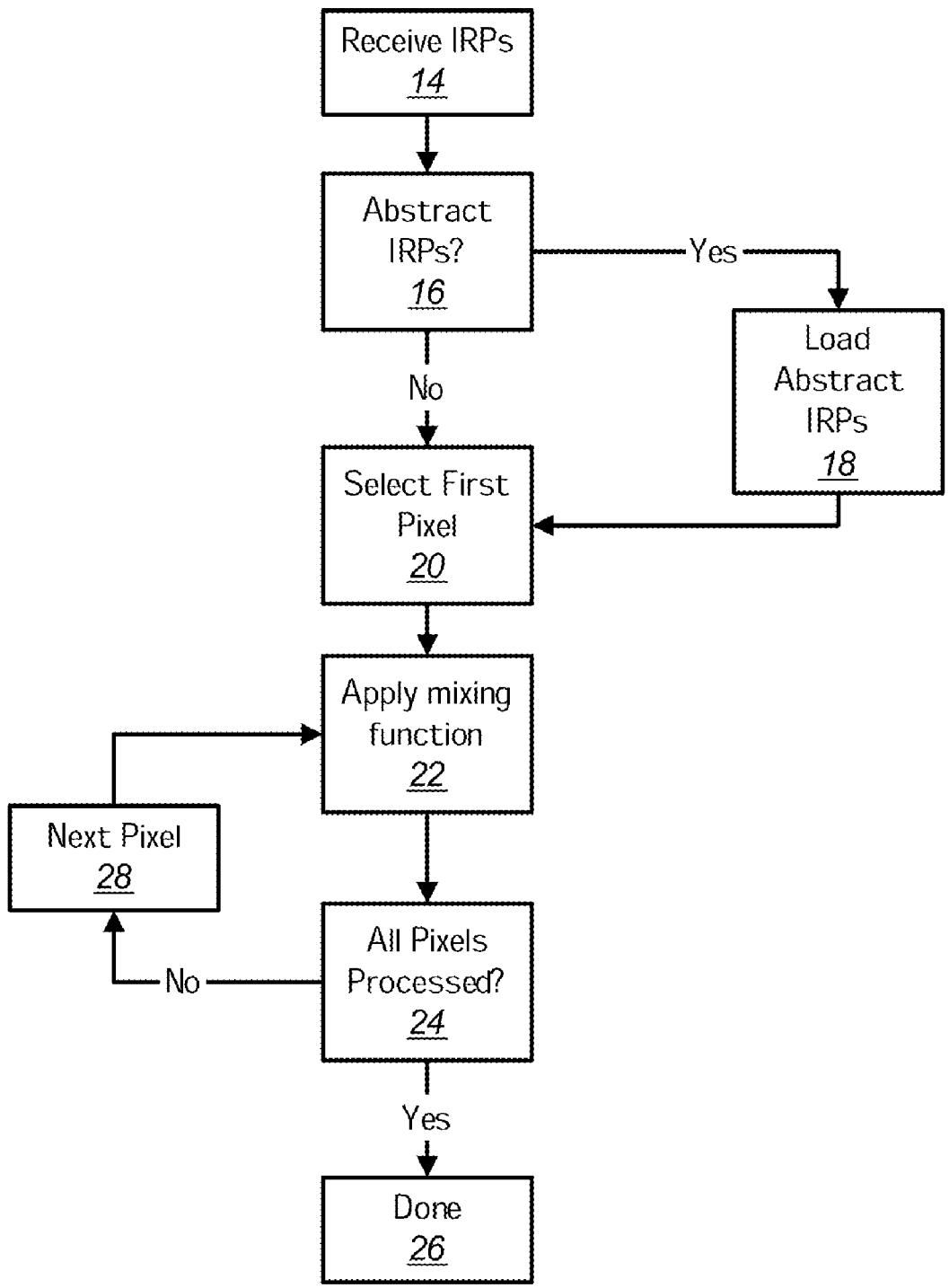
FIG. 3 is a flow chart of the steps of the application of a mixing function in accord with the disclosure.

The method for applying the mixing function is shown in FIG. 3. Begin with receiving 14 the IRPs in the image; test 16 to determine whether abstract IRPs are being used. If so, load 18 the abstract IRPs and then select 20 the first pixel to be processed; if not select 20 the first pixel to be processed. Then apply 22 the mixing function according to this disclosure, and test 24 whether all pixels chosen to be processed have been processed. If so, the method is completed 26, if not, the next pixel is selected 28 and step 22 is repeated.

Using the Pythagoras Distance Approach

In one embodiment of the mixing function, the Pythagoras equation can be used. Those skilled in the art will find that this is more suitable for IRPs that are intended to perform local color correction or similar changes to an image.

In step 22, apply the image modification to a greater extent, if the location of the IRP is close to that of the current pixel, or apply it to a lesser extent, if the location of the IRP is further away from the current pixel, using the Pythagoras equation to measure the distance, often also referred to as distance in Euclidian space.

Using Color Curves

In another embodiment, a mixing function could be created with the use of color curves. To create the function:

Step 22.1.1. Begin with the first channel of the image (such as the Red channel).

Step 22.1.2. All IRPs will have an existing brightness which is the brightness of the actual channel of the pixel where the IRP is located, and a desired brightness, which is the brightness of the actual channel of the same pixel after the image modification associated with its IRP has been applied. Find the optimal polynomial function that matches these values. For example, if the red channel has an IRP on a pixel with a value of 20, which changes the pixel's value to 5, and there is a second IRP above a pixel with the value of 80, which changes that channel luminosity to 90, all that is needed is to find a function that meets the conditions $f(20)=5$ and $f(80)=90$.

Step 22.1.3. Apply this function to all pixels of the selected channel.

Step 22.1.4. If all channels have not been modified, select the next channel and proceed with step 22.1.2.

Using Segmentation to Create the Mixing Function

In a further embodiment, the mixing function can be created using segmentation. To create the function:

Step 22.2.1. Segment the image using any appropriate segmentation algorithm.

Step 22.2.2. Begin with IRP 1.

Step 22.2.3. Apply the filter associated with that IRP to the segment where it is located.

Step 22.2.4. Select the next IRP.

Step 22.2.5. Unless all IRPs have been processed, proceed with step 22.2.3.

If there is a segment that contains two IRPs, re-segment the image with smaller segments, or re-segment the area into smaller segments.

Using Multiple Segmentations

In a still further embodiment of the current invention, the mixing function can be created using multiple segmentation. To create the function:

Step 22.3.1. Make "n" different segmentations of the image, e.g., n=4, where the first segmentation is rougher, (having few but larger segments), and the following segmentations are finer, (using more by smaller segments per image).

Step 22.3.2. Begin with IRP 1.

Step 22.3.3. Apply the image modification of that IRP at 1/nth opacity to all pixels in the segment that contains the current IRP of the first segmentation, then apply the image modification at 1/nth opacity to all pixels in the segment containing the IRP of the second segmentation. Continue for all n segmentations.

Step 22.3.4. Select the next IRP.

Step 22.3.5. Unless all IRPs have been processed, proceed with step 22.3.3.

Those skilled in the art will know that several segmenting algorithms may be used, and the "roughness" (size of segments) within the equation can be defined by a parameter.

Using a Classification Method

A classification method from pattern recognition science may be used to create another embodiment of the mixing function. To create the function:

Step 22.4.1. Choose a set of characteristics, such as saturation, x-coordinate, y-coordinate, hue, and luminance.

Step 22.4.2. Using existing methods of pattern recognition, classify all pixels of the image, i.e., every pixel is assigned to an IRP based on the characteristics, and assuming that the IRPs are centers of clusters.

Step 22.4.3. Modify each pixel with the image modification associated with the IRP to which the pixel has been classified.

Using a "Soft" Classification Method

In an even further embodiment of the current invention, it may be useful to modify the classification method to adjust for similarity of pixel attributes.

Typically, a pixel will not match the attributes of one IRP to a degree of 100%. One pixel's attributes might, for example, match one IRP to 50%, another IRP to 30% and a third IRP only to 20%. In the current embodiment using soft classification, the algorithm would apply the effect of the first IRP to a degree of 50%, the second IRP's effect at 30%, and the third IRP's effect to 20%. By utilizing this "Soft" Classification, one pixel is not purely associated with the most similar IRP.

One preferred embodiment that is described in detail later in this disclosure will show an implementation that follows a similar concept as described here.

Using an Expanding Areas Method

In another embodiment of the mixing function, an expanding areas method could be used to create a mixing function. To create the function:

Step 22.5.1. Associate each IRP with an "area" or location within the image. Initially, this area is only the pixel where the IRP is positioned.

Step 22.5.2. Apply the following to all IRP areas: Consider all pixels that touch the area. Among those, find the one whose attributes (color, saturation, luminosity) are closest to the initial pixel of the area. While comparing the attributes, minimize for the sum of differences of all attributes. Add this pixel to the area and assign the current area size in pixels to it. The initial pixel is assigned with a value of 1, the next added pixel is assigned a value of 2, the next with a value of 3, etc., until each pixel has been assigned a value.

Step 22.5.3. Repeat step 22.5.2 until all areas have expanded to the full image size.

Step 22.5.4. Apply all modifications of all IRPs to that pixel while increasing the application for those with smaller values.

One Preferred Mixing Function

In one preferred embodiment, a mixing function uses a set of attributes for each pixel (luminosity, hue, etc.). These attributes are compared to the attributes of the area where an IRP is positioned, and the Mixing Function applies those IRPs image modifications more whose associated attributes are similar to the actual pixel, and those IRPs image modifications less whose associated characteristics are very different from the actual pixel.

Unless otherwise specified, capitalized variables will represent large structures (such as the image I) or functions, while non-capitalized variables refer to one-dimensional, real numbers.

Definition of the Key Elements

A "Pixel-Difference-Based IRP Image Modification," from now on called an "IRP Image Modification," may be represented by a 7-tuple, as shown in Equation 1, where m is the amount of IRPs that will be made use of, and the number n is the amount of analyzing functions as explained later.

$$(F_{1\ldots m}, R_{1\ldots m}, I, A_{1\ldots n}, D, V, C_{1\ldots m}) \quad [1]$$

The first value, $F_{1\ldots m}$ is a set of the "Performing Functions." Each of these functions is an image modification function, which may be called with three parameters as shown in Equation 2.

$$I'_{xy} = F(I, x, y) \quad [2]$$

In Equation 2 the result $I'_{xy}$ is the pixel that has been calculated by F. I is the image on which F is applied, and x and y are the coordinates of the pixel in I that F is applied to. Such a performing function could be "darken pixels by 30%," for example, as shown in FIG. 1. In image science, these modifications are often called filters.

The second value in Equation 1, $R_{1\ldots m}$ is a number of m tuples. Each tuple represents values of an IRP, and is a set of pixel characteristics. Such a tuple R consists of 2*n+1 values, as in Equation [3].

$$((g_1 \ldots g_n), g^*, (w_1 \ldots w_n)) \quad [3]$$

$F_{1\ldots m}$ and $R_{1\ldots m}$ together represent the IRPs that the user has created. I will explain later how the IRPs that the user has placed can be converted into the functions and values $F_{1\ldots m}$ and $R_{1\ldots m}$. Later in this disclosure I indicate that a function F and a tuple R are "associated" with each other and with an IRP if they F and R together represent an IRP.

The third value I in Equation 1 is the image with the pixels $I_{xy}$. This image can be of any type, i.e., grayscale, Lab, CMYK, RGB, or any other image representation that allows Performing Functions (Equation [2]) or analyzing functions (Equation [4]) to be performed on the image.

The fourth element $A_{1\ldots n}$ in Equation 1 is a set of n "Analyzing Functions" as represented in Equation [4].

$$A_n(I, x, y) = k \quad [4]$$

These functions, unlike the Performing Functions F, calculate a single real number k for each pixel. These functions extract comparable attributes out of the image, such as saturation, luminance, horizontal location or vertical location, amount of noise in the region around the coordinates x, y, and so forth. The number n is the amount of Analyzing Functions.

The function's results need to be comparable. That is, the difference of the results of two different pixels applied to the same Analyzing Function can be represented by a number. For example, if $p_1$ is a dark pixel and $p_2$ is a bright pixel, and A is a function that calculates the luminance of a pixel, then $|A(p_1)-A(p_2)|$ is an easy measure for the luminosity difference of both pixels. Note: Analyzing Functions in this disclosure refer to functions that calculate characteristics of an image, and must not be confused with the mathematical term "analytic functions." The result of an Analyzing Function applied to a pixel will for further reference in this disclosure be called a "Characteristic" of the pixel.

The Analyzing Functions can analyze the color of a point x, y in the image I, the structure of the point x, y in the image I, and the location of a point x, y in the image I itself.

Later in this disclosure I refer to "Color Analyzing Functions," "Structure Analyzing Functions" and "Location Analyzing Functions." Color Analyzing Functions are any functions on the pixel's values itself, such as r, g and b, while Structure Analyzing Functions also take the values and differences of a group of pixel around the point x, y into account, and Location Analyzing Functions are any functions on x and y.

For example, the Analyzing Function $A(I, x, y)=x+y$ is a Location Analyzing Function of the pixel. An example of a Color Analyzing Function would be $A(I, x, y)=I_{xy(r)}+I_{xy(g)}+I_{xy(b)}$, where r, g and b refer to the RGB channels of the image. An example of a Structure Analyzing Function would be $A(I, x, y)=I_{xy(r)}-I_{(x+1)y(r)}$. Note: These three categories of Analyzing Functions are not disjoint. For example, the function $A(I,x,y)=I_{xy(r)}-I_{(x+1)(y-2)(g)}+x$ is a Color Analyzing Function, a Structure Analyzing Function, and a Location Analyzing Function simultaneously.

"Normalizing" the Analyzing Functions and limiting the range of possible values such that their results have approximately the range of 0 . . . 100 will simplify the process.

The fifth element D in Equation 1 is a "Difference Function" which can compare two vectors of n values against each other and provides a single number that is larger the more the two vectors of n values differ and zero if the two sets of n numbers are identical. In doing so, the function D is capable of weighing each individual number of the two sets with a weight vector $(w_{1 \ldots n})$ as in Equation [5].

$$d=D((a_{1\ldots n}), (b_{1\ldots n}), (w_{1\ldots n})) \quad [5]$$

D is defined as follows:

$$D((a_{1\ldots n}), (b_{1\ldots n}), (w_{1\ldots n}))=\|(a_1*w_1-b_1*w_1), \ldots, (a_n*w_n-b_n*w_n)\| \quad [6]$$

where $\|\cdot\|$ refers to any norm, such as the distance in Euclidian space, which is also known as $\|\cdot\|_2$.

In other words, the more $a_{1\ldots n}$ and $b_{1\ldots n}$ differ, the higher the result of the Difference Function D, while the weights $w_{1\ldots n}$ control the importance of each element of the vectors of a and b. By setting elements of w to zero, D will disregard the according elements of a and b.

Suitable Difference Functions in this implementation are:

$$D((a_{1\ldots n}), (b_{1\ldots n}), (w_{1\ldots n}))=|a_1-b_1|*w_1+|a_2-b_2|*w_2+\ldots+|a_n-b_n|*w_n \quad [7]$$

$$D((a_{1\ldots n}), (b_{1\ldots n}), (w_{1\ldots n}))^2=(a_1*w_1-b_1*w_1)^2+\ldots+(a_n*w_n-b_n*w_n)^2 \quad [8]$$

The weighed Pythagoras function [8] leads to better results than the simple function [7], while function [8] provides for accelerated processing. To those skilled in the art, the norms used in [7] and [8] may also be known as $\|\cdot\|_1$ and $\|\cdot\|_2$.

A function D* that is derived from the function D is defined as follows:

$$D*((a_{1\ldots n}), (b_{1\ldots n}), (w_{1\ldots n}), g*)=D((a_{1\ldots n}), (b_{1\ldots n}), (w_{1\ldots n}))+g* \quad [9]$$

In other words: D* measures the difference of $a_{1\ldots n}$ and $b_{1\ldots n}$ weighed with $w_{1\ldots n}$, and adds the real number g* to the result.

For accelerated performance or for simpler implementation, another Difference Function $\overline{D}$ or $\overline{D}*$ can be made use of which does not utilize weights. Systems as described in this disclosure that do not utilize weights are easier to use and faster to compute, but less flexible. $\overline{D}$ and $\overline{D}*$ are defined as follows:

$$\overline{D}((a_{1\ldots n}), (b_{1\ldots n}))=D((a_{1\ldots n}), (b_{1\ldots n}), (1,1,\ldots,1)) \quad [10]$$

$$\overline{D}*((a_{1\ldots n}), (b_{1\ldots n}), g*)=D*((a_{1\ldots n}), (b_{1\ldots n}), (1,1,\ldots,1), g*) \quad [11]$$

The sixth element, V, in Equation 1 is an "Inversion Function" that has the following characteristics with $V: \mathbb{R}_0^+ \to \mathbb{R}^+$:

$V(x)>0$ for all $x \geq 0$
$V(y)<V(x)$ for all $x<y$ for all $x, y \geq 0$
$\lim x \to \infty$ of $V(x)=0$.

The Gaussian bell curve or $V(x)=1/(x+0.001)$ are such functions. Note: $V(x)=1/x$ is not appropriate as the result of $V(0)$ would not be defined.

In one preferred embodiment, the function in Equation [12] is used, where t is any number that is approximately between 1 and 1000. The value $t=50$ is a good value to start with, if the Analyzing Functions are normalized to a range of 0 . . . 100 as referred to in the section on "Normalizing Analyzing Functions" that follows equation [4] in this disclosure.

$$V(x)=0.5^{(x/t)} \quad [12]$$

The Inversion function will be used later in this disclosure to calculate an "Inverse Difference" between two tuples $a_{1\ldots n}$ and $b_{1\ldots n}$ by calculating $V(D*((a_{1\ldots n}), (b_{1\ldots n}), (w_{1\ldots n}), g*))$ or $V(D((a_{1\ldots n}), (b_{1\ldots n}), (w_{1\ldots n})))$ or $V(\overline{D}*((a_{1\ldots n}), (b_{1\ldots n}), g*))$ or $V(\overline{D}((a_{1\ldots n}), (b_{1\ldots n})))$. The purpose of this Inverse Difference is to provide a high value if similarity between the tuples $a_{1\ldots n}$ and $b_{1\ldots n}$ is detected, and a low value, if the tuples $a_{1\ldots n}$ and $b_{1\ldots n}$ are different.

The seventh element, $C_{1\ldots m}$, in equation [1] is a set of m "Controlling Functions". Each of those Controlling Functions has m parameters and needs to suit the following conditions:

$C_i(p_1 \ldots p_m) \geq 0$ for all $p_1 \ldots p_m$ and for all $1 \leq i \leq m$ (all $p_1 \ldots p_m$ will never be negative).

$C_i(p_1 \ldots p_m)$ is high if $p_i$ has a high value compared to the mean of $p_1 \ldots p_m$ $C_i(p_1 \ldots p_m)$ is low if $p_i$ has a low value compared to the mean of $p_1 \ldots p_m$ $C_1+C_2+\ldots+C_m$ is always 1.

$C_i(p_1 \ldots p_m)=C_{\Pi(i)}(p_{\Pi(1)} \ldots p_{\Pi(m)})$ with $\Pi$ being any permutation $\Pi:(1 \ldots m) \to (\Pi(1) \ldots \Pi(m))$.

A recommended equation for such a controlling function would be as shown in Equation [13].

$$C_i(p_1 \ldots p_m)=p_i/(p_1+p_2+\ldots+p_m) \quad [13]$$

The purpose of a controlling function $C_i$ is to provide a large number (close to 1) if the $i^{th}$ element of the parameters $p_1 \ldots p_m$ is high relative to the other parameters, and a small value (close to 0) if the $i^{th}$ element of the parameters $p_1 \ldots p_m$ is relatively low, and to "down-scale" a tuple of m elements so that their sum is 1.0, while the relations between the elements of the m-tuple are constrained. If the Controlling Functions are applied to a set of m Inverse Differences, the m results of the Controlling Functions will be referred to as "Controlled Inverse Differences" later in this disclosure.

Setting the Elements F, R and A

The following section describes the manner in which the user-defined (or otherwise defined) m IRPs can be converted into its associated Performing Functions F and tuples R.

Note: In contrary to F and R, the last four elements of the tuple (A, D, V, C) are functions that are defined by the programmer when a system using IRPs is created, and are predefined or only slightly adjustable by the user. However, to a certain extent, a system may give the user control over the functions A, D, V and C; and there can be certain components of the first two elements $F_{1 \ldots m}$ and $R_{1 \ldots m}$ that will be set by the application without user influence. This will become clearer later in this disclosure.

Figure 4:
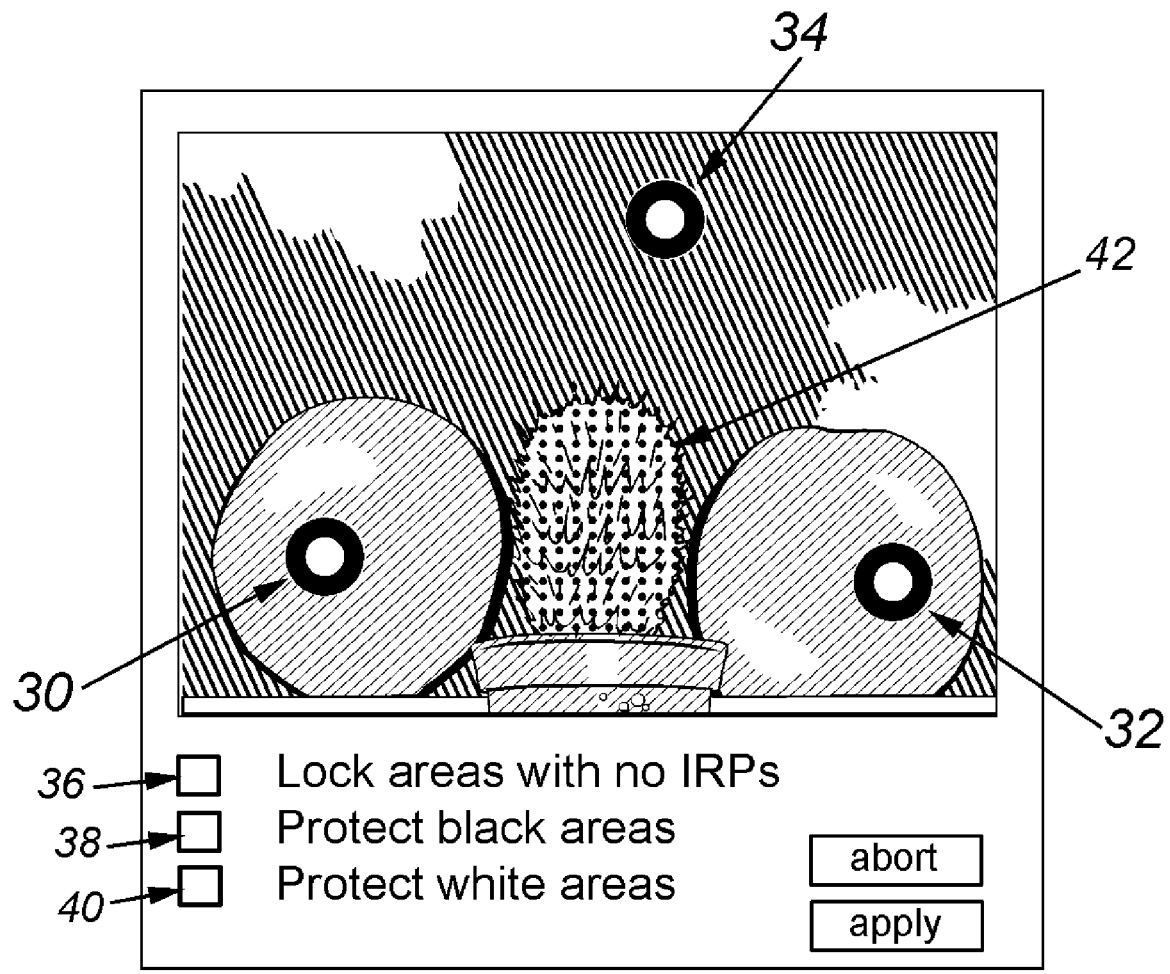
FIG. 4 is an illustration of one embodiment of a dialog box useable in the application program interface of the present invention.

FIG. 4 provides a sample image of an image in a dialog box an image processing program, for the purposes of illustrating modifications to an image using the current invention. For example, graphic tag 30 representing IRP $R_1$ in FIG. 4, placed on the left apple, will be to increase saturation, graphic tag 32 representing IRP $R_2$, placed on the right apple, will be decrease saturation, and graphic tag 34 representing IRP $R_3$, placed on the sky, will darken its associated image component.

To do so, three performing functions $F_1 \ldots F_3$ are necessary, where $F_1$ increases the saturation, $F_2$ decreases the saturation, and $F_3$ is an image darkening image modification.

The system should typically allow the user to set such a Performing Function before or after the user places an IRP in the image. In such cases, the user first defines the type of the performing function (such as "sharpen," or "darken," or "increase saturation," etc.) and then the user defines the behavior of the function (such as "sharpen to 100%," or "darken by 30 levels," etc.).

In the current example, three tuples $R_1 \ldots R_3$ are necessary. For each IRP, there is always one tuple R and one Performing Function F. It is not necessary, however, that all Performing Functions are different. As previously disclosed, IRPs in the current invention are used to store Characteristics of an individual pixel or a particular area in an image. As such, using the current example of modifying FIG. 4, three IRPs are necessary: an IRP that stores the Characteristics of the first apple, an IRP that stores the Characteristics of the second apple, and an IRP that stores the Characteristics for the sky.

This can typically be done by reading the Characteristics of the image location where the user has placed an IRP. If a user has placed an IRP on the image coordinate location x, y in the image I, the values of $R=((g_1 \ldots g_n), g^*, (w_1 \ldots w_n))$ can be calculated as follows:

$$g_1 \ldots g_n = A_1(I,x,y) \ldots A_n(I,x,y) \quad [14]$$

$$g^*=0$$

$w_1 \ldots w_n$=default value, for example, 1.

The user may have control over the values of R after they were initially filled. This control may be allowed to varying extents, such as weights only versus all variables.

In our example the two red apples will be modified differently. Presumably, both apples have the same color and the same structure, and each only differs in its location. The sky, containing the third IRP, has a different location than the apples, and also a different color.

As we now see that both location and color are relevant for differentiating between the three relevant image areas, it will be obvious that what is needed is at least one or more Location Analyzing Functions and one or more Color Analyzing Functions. In cases where the application allows the user only to perform global color changes, it would be sufficient to choose only Color Analyzing Functions.

Some Analyzing Functions are as follows, where $I_{xy(r)}$ refers to the red channel's value of the image I at the location x,y and so forth.

$$A_1(I,x,y)=x \quad [15a]$$

$$A_2(I,x,y)=y \quad [15b]$$

$$A_3(I,x,y)=I_{xy(r)} \quad [15c]$$

$$A_4(I,x,y)=I_{xy(g)} \quad [15d]$$

$$A_5(I,x,y)=I_{xy(b)} \quad [15e]$$

$A_1$ and $A_2$ are Location Analyzing Functions and $A_3$ through $A_5$ are Color Analyzing Functions.

Note: $A_3$ through $A_5$, which only provide the red, green, and blue values, are suitable functions for a set of color-dependent analytical functions. For even better performance it is recommended to derive functions that calculate luminosity, saturation, etc., independently. Using the channels of the image in Lab color mode is appropriate. However, the following Analyzing Functions are also examples of appropriate Analyzing Functions, where the capitalized variables X, Y, R, G, B represent the maximum possible values for the coordinates or the color channels.

$$A_1(I,x,y)=x*100/X \quad [16a]$$

$$A_2(I,x,y)=y*100/Y \quad [16b]$$

$$A_3(I,x,y)=(I_{xy(r)}+I_{xy(g)}+I_{xy(b)})*100/(R+G+B) \quad [16c]$$

$$A_4(I,x,y)=100*(I_{xy(r)}-I_{xy(g)})/(R+G)+50 \quad [16d]$$

$$A_5(I,x,y)=100*(I_{xy(r)}-I_{xy(b)})/(R+B)+50 \quad [16e]$$

Equations [16] shows Analyzing Functions that are also normalized to a range of 0 . . . 100 (see the description for normalizing Analyzing Functions after equation [4]) Normalizing the Analyzing Functions aids in the implementation, as normalized Analyzing Functions have the advantage that their results always have the same range, regardless of the image size or other image characteristics. The Analyzing Functions found in Equations [15] will be used throughout this disclosure when discussing values from $R_{1 \ldots m}$ Note: It may not be useful to adjust the set of Analyzing Functions from image to image. It may be preferable to use one set of Analyzing Functions that is suitable for many or all image types. When the current invention is used for standard color enhancements, the Analyzing Functions of Equations [16] are good to start with.

A Closer Look at IRPs

As previously discussed in this disclosure, the tuples R of an IRP store the information of the Characteristics of the region to which an operation will be applied, the region of interest. These tuples R acquire the Characteristics typically by applying the n analytical functions to the image location $I_{xy}$ where the IRP was placed, as in equation [14].

In the current embodiment, the Difference Function D* will compare the values $g_1 \ldots g_n$ of each IRP to the results of the n Analyzing Functions for all pixels in the image, using the weights $w_1 \ldots w_n$.

For example, if the pixel in the middle of the left apple has the coordinates (10, 100) and the RGB color 150, 50, 50 (red), then the Analyzing Functions $A_1 \ldots A_n$ of this pixel will have the values $A_1$=10, $A_2$=100, $A_3$=150, $A_4$=50, $A_5$=50, therefore, the values $g_1 \ldots g_n$ will be set to (10, 10, 150, 50, 50).

g* is set to zero for this IRP.

The weights will control the significance of the individual elements of $g_1 \ldots g_5$. See Equations [6], [7] and [8]. For example, if the weights $w_1 \ldots w_5$ are set to (10,10,1,1,1), the location related information, gained through $A_1$ and $A_2$, will be more significant than the color related information from $A_3$ through $A_5$. (This IRP would be more location dependent than color dependent).

If, however, $w_1 \ldots w_5$=(0,0,3,3,0) is set, only the red and green channels of the pixel information would be considered by the Difference Function, and the IRP would not differentiate between the location of a pixel or its blue channel. As previously mentioned, in FIG. 4 the location-dependent and color-dependent Characteristics play a role in differentiating the apples from each other and from the sky. Therefore, we will use equal weights for all 5 characteristics.

Setting all weights all to 1, the first IRP would be:

$R_1$=(g1 ... g5, g*, w1 ... w5)=((10,100,150,50,50), 0, (1,1,1,1,1))

(the first apple at the coordinate 10,100 with the color 150,50,50)

The second and third IRP could have values such as $R_2$=((190,100,150,50,50), 0, (1,1,1,1,1))

(the second apple at the coordinate 190,100 with the color 150,50,50)

$R_3$=((100,10,80,80,200), 0, (1,1,1,1,1)).

(the sky at the coordinate 100,10 with the color 80,80,200)

The Mixing Function

An abbreviation related to the Difference Function follows. The purpose of the Difference Function is to calculate a value that indicates how "different" a pixel in the image is from the Characteristics that a certain IRP is associated with.

The "Difference" between an IRP $R$=(($g_1 \ldots g_n$), g*, ($w_1 \ldots w_n$)) and a pixel $I_{xy}$ can be written as follows:

$$|R-I_{xy}|=D^*((g_1 \ldots g_n), (A_1(I,x,y), \ldots , A_n(I,x,y)), (w_1, \ldots, w_n), g^*) \quad [17]$$

The Difference referred to in this embodiment is always the result of the Difference function, and should not be confused with the "spatial" distance between two pixels in an image.

If, for ease of implementation or for faster computing of the Mixing Function, the Difference Functions D, $\overline{D}$ or $\overline{D}^*$ are used, the abbreviation would be:

$$|R-I_{xy}|=D((g_1 \ldots g_n), (A_1(I,x,y), \ldots , A_n(I,x,y)), (w_1, \ldots, w_n)) \quad [18]$$

$$|R-I_{xy}|=\overline{D}((g_1 \ldots g_n), (A_1(I,x,y), \ldots, A_n(I,x,y))) \quad [19]$$

$$|R-I_{xy}|=\overline{D}^*((g_1 \ldots g_n),(A_1(I,x,y), \ldots, A_n(I,x,y)), g^*) \quad [20]$$

Given the 7-tupel of an IRP based image modification $(F_{1 \ldots m}, R_{1 \ldots m}, I, A_{1 \ldots n}, D, V, C)$ then the modified image I*xy is as show in Equation [21].

$$I^*_{xy} = \sum_{i=1}^{m} F_i(I, x, y) * C_i(V(|R_1 - I_{xy}|), \ldots , V(|R_m - I_{xy}|)) \quad [21]$$

Apply this equation to each pixel in the image I, to receive the processed image I*, where all Performing Functions were applied to the image according to the IRPs that the user has set. This equation compares the n Characteristics of each pixel x, y against all IRPs, and applies those Performing Functions $F_i$ to a greater extent to the pixel, whose IRPs have similar Characteristics, while the Controlling Function ensures that the sum of all functions $F_i$ does not exceed unwanted ranges.

In an even further preferred embodiment of the current invention, equation [22] would be used.

$$I^*_{xy} = I_{xy} + \sum_{i=1}^{m} \Delta F_i(I, x, y) * V(|R_1 - I_{xy}|) \quad [22]$$

In contrast to equation [21], equation [22] requires that the Inversion Function V does not exceed values of approximately 1. The Gaussian Bell curve $V(x)=e^{-x^2}$ or $1/(x+1)$ or equation [12] could be such functions. The function $\Delta F$ expresses the difference between the original and modified image (where $I'_{xy}=I_{xy}+\Delta F(I, x, y)$ instead of $I'_{xy}=F(I, x, y)$, see Equation 2).

When comparing Equation [21] and [22], the terms $V(|R_i-I_{xy}|)$ represent the Inverse Difference of the currently processed tuple $R_i$ and the pixel $I_{xy}$. Only equation [21] uses Controlled Inverse Differences. If equation [21] is used, each pixel in the image will be filtered with a 100% mix of all Performing Functions, regardless if an image region contains a large or a small number of IRPs. The more IRPs that are positioned in the image, the less effect an individual IRP will have if Equation [21] is used. If Equation [22] is used, the IRPs will not show this competitive nature. That is, each IRP will modify the image to a certain extent regardless whether it is placed amidst many other IRPs or not. Therefore, if Equation [22] is used, placing multiple IRPs in an image area will increase the total amount of image modification in this area.

Further Embodiments

In a further embodiment, the concept of "Abstract IRPs" can be used to enhance the performed image modification, or to change the behavior of the image modification.

Abstract IRPs are similar to other IRPs as they are pairs of a Performing Function F and a set of values R. Both Abstract IRPs and IRPs may be used together to modify an image. Abstract IRPs, however, are not "user defined" IRPs or IRPs that are placed in the image by the user. The function of an Abstract IRP can be to limit the local "effect" or intensity of an IRP. In this regard, Abstract IRPs are typically not "local", i.e., they affect the entire image. Abstract IRPs can be implemented in a manner that the user turns a user-controlled element on or off as illustrated later, so that the Abstract IRPs are not presented as IRPs to the user, as shown in FIG. 4.

Note: The use of Abstract IRPs as disclosed below requires that equation [21] is implemented as the mixing function, and that the Difference function is implemented as shown in equation [17] or [20].

In FIG. 4 the user has positioned graphic tags 30, 32, and 34 representing IRPs $R_1 \ldots R_3$. Controls 36, 38, and 40 indicate a set of three possible user controls. When control 36 is used, the application would use one additional pre-defined Abstract IRP in the image modification. Such pre-defined, Abstract IRPs could, for example, be IRPs $R_4$ through $R_6$ as described below.

When the check box in control 36 is enabled, Abstract IRP $R_4$, is utilized. Without the use of an Abstract IRP, when an image has an area such as the cactus 42 which is free of IRPs, this area will still be filtered by a 100% mix of the effects of all IRPs (see equation [19] and the Controlling Function C). In the current image example, the cactus 42 would be affected by a mix of the IRPs $R_1 \ldots R_3$, although the user has placed no IRP on the cactus.

To remedy this, Abstract IRP $R_4$ is utilized which makes use of the g* value. Note: g* is used as described below when the mixing function of equation [21] is being implemented.

The Abstract IRP could have zero weights and a g* value greater than zero, such as $R_4=((0,0,0,0,0), 50, (0,0,0,0,0))$ The Difference Function $|R_4-I_{xy}|$ will return nothing but 50 whatever the Characteristics of the pixel $I_{xy}$ might be. The value of g* should be in the range of 1 to 1000. 50 is a good value to start with.

The purpose of this IRP and its $R_4$ is that pixels in areas free of IRPs, such as in the middle of the cactus 42, will have a lower Difference to $R_4$ (which is constantly set to 50) than to $R_1 \ldots R_3$. For pixels in image areas where one or more IRPs are set, $R_4$ will not be the IRP with the lowest Difference, as a different IRP will likely have a lower Difference. In other words: areas free of non-Abstract IRPs are controlled predominantly by $R_4$, and areas that do contain non-Abstract IRPs will be affected to a lesser extent by $R_4$. If the Performing Function $F_4$ is set to a function that does not change the image ($F_4(I,x,y)=Ixy$), $R_4$ ensures that areas free of IRPs will remain mainly unaffected.

In order to make Abstract IRP $R_4$ more effective (i.e., IRPs $R_1 \ldots R_3$ less effective), g* can be lowered, and the value g* in $R_4$ can be raised to make the "active" IRPs $R_1 \ldots R_3$ more effective. A fixed value for g* in $R_4$ may be implemented if the system that is programmed is designed for image retouchers with average skills for example, and applications designed for advanced users may permit the user to change the setting of g*.

In an even further embodiment of the current invention, Abstract IRPs could be used whereby an IRP has weights equaling zero for the location dependent parameters, and values for $g_1 \ldots g_n$ which would represent either black or white, combined with a Performing Function which does not affect the image.

Two of such Abstract IRPs—one for black, one for white—would be suitable to ensure that black and white remain unaffected. Such Abstract IRPs could be:

$R_5=((0,0,255,255,255), 0, (0,0,1,1,1))$
$R_6=((0,0,0,0,0), 0, (0,0,1,1,1))$

As with $R_4$ and $F_4$, the Performing Functions $F_5$ and $F_6$ would also be functions that do not perform any image modification, so the IRPs 5 and 6 would ensure that colors such as black and white remain mainly unaffected by the IRPs that the user places.

As shown in control 38 and control 40, these Abstract IRPs can be implemented providing the user with the ability to turn checkboxes or similar user controls on or off. Such checkboxes control the specified function that the Abstract IRPs would have on the image. When the associated checkbox is turned on, the application uses this Abstract IRP This process is referred to as "load abstract IRPs" in step 18 of FIG. 3.

It is not necessary that all Abstract IRPs are associated with a Performing Function that leaves the image unaffected. If for instance an implementation is programmed that allows the user to sharpen the image, an abstract IRP such as $R_4$ above can be implemented, where the associated Performing Function F4 sharpens the image to 50%. The user could then place IRPs whose Performing Functions sharpen the image to for instance to 0%, 25%, 75% or 100% in the image. This would mean that the image is sharpened to an individual extent where the user has set IRPs, and to 50% anywhere else.

In an even further embodiment, the IRP based image modification can be used in combination with a further, global image modification $I'_{xy}=M(I, x, y)$, where M is an image filter, combining the IRP based image modification and the uniform image modification M as shown in Equation [23].

$$I^*_{xy} = M\left(I_{xy} + \sum_{i=1}^{m} \Delta F_i(I, x, y) * V(|R_i - I_{xy}|)\right) \quad [23]$$

Equation [23] is derived from equation [21]. Equation [22] could also be utilized for this embodiment. The current embodiment is useful for a variety of image filter types M, especially those that lead to unwanted image contrast when applied, causing what is known to those skilled in the art as "blown-out areas" of a digital image. Such image filters M could be color to black and white conversions, increasing the overall contrast, inverting the image, applying a strong stylistic effect, a solarization filter, or other strong image modifications.

Applying such an image modification such as a color to black and white conversion without the current invention, the user would first convert the image to black and white, inspect areas of the resulting black and white image that are too dark or too bright, then undo the image modification, make changes to the original image to compensate for the filter application, and then re-apply the image modification, until the resulting image no longer has the unwanted effects.

While implementing this filter in combination with an IRP based image modification as shown in Equation [23], the user can modify contrast and color of the image as the image modification M is applied, such as in the example of the black and white conversion, thus accelerating the method of application by the user for the black and white conversion process and providing improved results.

In an even further embodiment, the Performing Functions $F_i$ can be replaced with "Offset Vectors" $S_i=(\Delta x_i, \Delta y_i)^T$, where $S_1 \ldots _m$ are the m Offset Vectors associated with the m IRPs, and $\Delta x$ and $\Delta y$ are any real numbers. In this case, the user would define such an Offset Vector of an IRP for instance by defining a direction and a length, or by dragging an IRP symbol with a mouse button different from the standard mouse button. The mixing function, for instance if derived from equation [21], would then be $$S_{xy} = \sum_{i=1}^{m} S_i * C_i(V(|R_1 - I_{xy}|), \ldots , V(|R_m - I_{xy}|)) \quad [24]$$

Of course, as the result of this function is assembled of vectors of $\mathbb{R}^2$, the result is a matrix $S_{xy}$ of the same horizontal and vertical dimensions as the image, whose elements are vectors with two elements. For further reference, I refer to this matrix as an "Offset Matrix".

Using this implementation, the user can easily attach IRPs to regions in the image and at the same time define in which directions the user wants these regions to be distorted or altered.

The result of the mixing function is an offset matrix that contains information relating to in which direction a pixel of the original image I needs to be distorted to achieve the distorted image $I^d$. The benefit of calculating the Offset Matrix this way is that the Offset Matrix adapts to the features of the image, provided that the vectors $R_{1...m}$ have weights other than zero for pixel luminosity, chrominance, and structure Characteristics. The image $I^d$ can be calculated the following way:

(1) Reserve some memory space for $I^d$, and flag all of its pixels.
(2) Select the first coordinate (x,y) in I.
(3) Write the values (such as r,g,b) of the pixel $I_{xy}$ into the picture $I^d$ at the location $(x,y)+S_{xy}$, and un-flag the pixel at that location in $I^d$.
(4) Unless all pixels in I are considered, select next coordinate (x,y) and proceed with step (3).
(5) Select first pixel in $I^d$ that is still flagged.
(6) Assign the values (such as r,g,b) of the closest non-flagged pixel to this pixel. If multiple non-flagged pixels are equally close, select the values of that pixel that was created using the lowest Offset Vector $S_{xy}$.
(7) If flagged pixels are left, select next flagged pixel in $I^d$ and proceed with step (6).

In other words, copy each pixel from I into $I^d$ while using the elements of the Offset Matrix S for offsetting that pixel. Those areas that remain empty in $I^d$ shall be filled with the pixel values neighbored to the empty area in $I^d$, while values of pixels that were moved to the least extent during the copy process shall be preferred.

In a further embodiment, a plurality or IRPs can be saved and applied to one or more different images. In batch processing applications, this plurality of IRPs can be stored and applied to multiple images. In such an embodiment, it is important that IRPs whose weights for location-dependent characteristics are zero.

In a further embodiment, the user may be provided with simplified control over the weights of an IRP by using a unified control element. In Equations [15] and Equations [16], five Characteristics are utilized, two of which are location dependent Characteristics sourcing from Location Analyzing Functions.

In creating such a unified control element, one control element controls these two weights. This unified control element could be labeled "location weight," instead of the two elements "horizontal location weight" and "vertical location weight."

In a further embodiment, user control elements may be implemented that display different values for the weights as textual descriptions instead of numbers, as such numbers are often confusing to users. Those skilled in the art will recognize that it may be confusing to users that low values for weights lead to IRPs that have more influence on the image, and vice versa. Regarding weights for location-dependent Characteristics (such as $w_1$ and $w_2$ in the current example), the user could be allowed to choose one out of five pre-defined weights for textual descriptions of different values for the location dependent weights $w_1$ and $w_2$ as show in Table 1.

TABLE 1

|  | $w_1$ | $w_2$ |
|---|---|---|
| "global" | 0 | 0 |
| "almost global" | 0.3 | 0.3 |
| "default" | 1 | 1 |
| "local" | 3 | 3 |
| "very local" | 8 | 8 |

Figure 5:
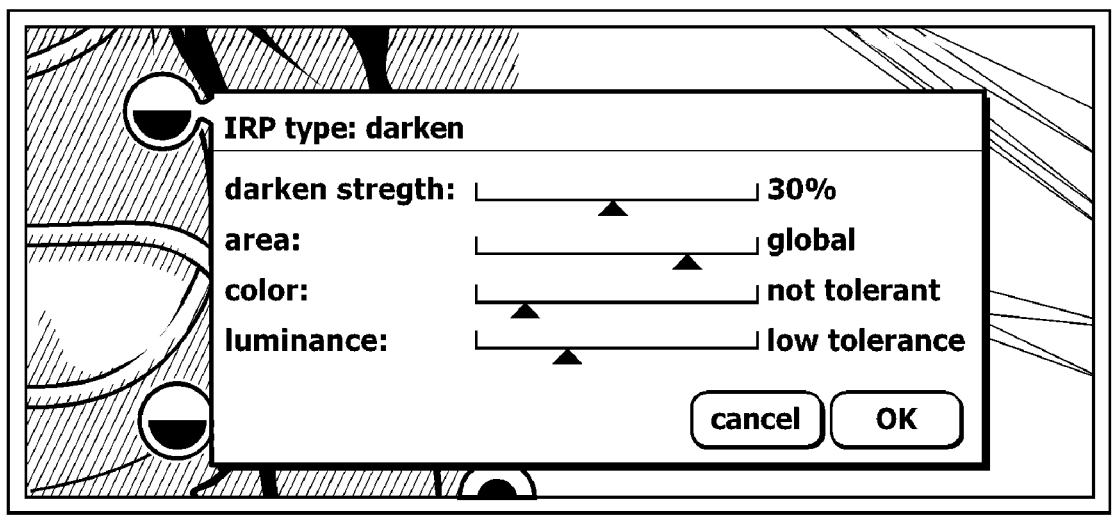
FIG. 5 is an illustration of one embodiment of a dialog box implementing simplified user control over weights useable in the application program interface of the present invention.

FIG. 5 illustrates how such simplified user control over weights may be implemented in an image processing program.

In a further embodiment, the user control over weights could be simplified to such an extent that there are only two types of weights for IRPs that the user can choose from: "strong" that utilizes weight vectors such as (1,1,1,1,1) and "weak" that utilizes weight vectors such as (3,3,3,3,3). Note: As mentioned before, large weights make the area that an IRP has influence on smaller, and vice versa.

For example, the user may place IRPs in the sky with an associated enhancement to increase the saturation of an area identified by one or more IRPs. In the same image, the user may place additional IRPs with an assigned function to decrease contrast, identifying changes in contrast and the desired changes in contrast based on the location of each individual IRP. In a preferred embodiment, IRPs may include a function that weights the intensity of the image-editing function as indicated by the user.

In a different implementation of the invention, IRPs could be placed to identify a color globally across the image, and using an associated command, increase the saturation of the identified color.

In a still further preferred embodiment, IRPs could be used to provide varying degrees of sharpening across a digital image. In such an implementation, multiple IRP's could be placed within specific image regions or image characteristics, such as the eyes, the skin, and hair of a portrait, and different sharpening intensities assigned to each IRP and applied to the digital image while considering the presence of color and/or contrast and the relative difference of each IRP from one another to provide the desired image adjustment.

User Definable Image Reference Regions

The user can not only position reference points (IRPs) into the image, but also reference regions, from now on called IRRs. IRRs can be considered to a certain extent as "selections", as their basic principle is to allow the user to circle an area of interest. However, since IRRs are based upon IRPs, IRRs are significantly different from state-of-the-art selections as that the IRR performs only as a "region of interest". The software does not apply the Performing Function exactly to those pixels of the IRR while excluding those pixels outside the IRR. Instead, the IRR is fed into the mixing function along with the IRPs. This leads to the effect that the Performing Function that is assigned to the IRR is applied adaptively to the image—it will show the same adaptive nature as IRPs. At the same time, the user has more control over an IRR than over an IRP since the effect of an IRR will also roughly adapt to the shape of the Image Reference Region.

The User Interaction of IRRs:

IRRs fit into Mixing Functions in a very similar fashion as IRPs, which will be described later. The user interaction of an IRR is actually also similar to an IRP. While positioning an IRP on the image would typically be performed by the user by a mouse click at the point of interest, the region of an IRR can be defined by any suitable method to define a region, for instance:

allowing the user to define a polygon by successively defining the edges of a polygon with mouse clicks, allowing the user to perform brush strokes over the region of interest, allowing the user to circle the region of interest with a mouse, allowing the user to circle the region of interest with a mouse while supporting the user with a magnetic edge-adapting functionality.

The graphical representation of an IRR could be implemented by displaying the margin of the ROI for instance by a dashed line (aka "marching ants"). If an implementation is preferred in which the dialog for parameter input and/or the input for the weights is displayed at the related position in the image (as shown in FIG. 5), this can easily be done by showing the related dialog at the margin of the IRR, showing the related dialog in the center of the IRR, or adding an icon to the IRR and showing the dialog connected or close to this icon.

It will be evident to those skilled in the art that countless ways are possible to display a graphical parameter input dialog in the spatial region of an IRR.

Until the image is finally rendered, the user can edit IRRs and IRPs and the associated Performing Function parameters (e.g., image enhancement parameters) in any arbitrary sequence, which is a significant advantage in comparison to other image editing processes.

Figure 6:
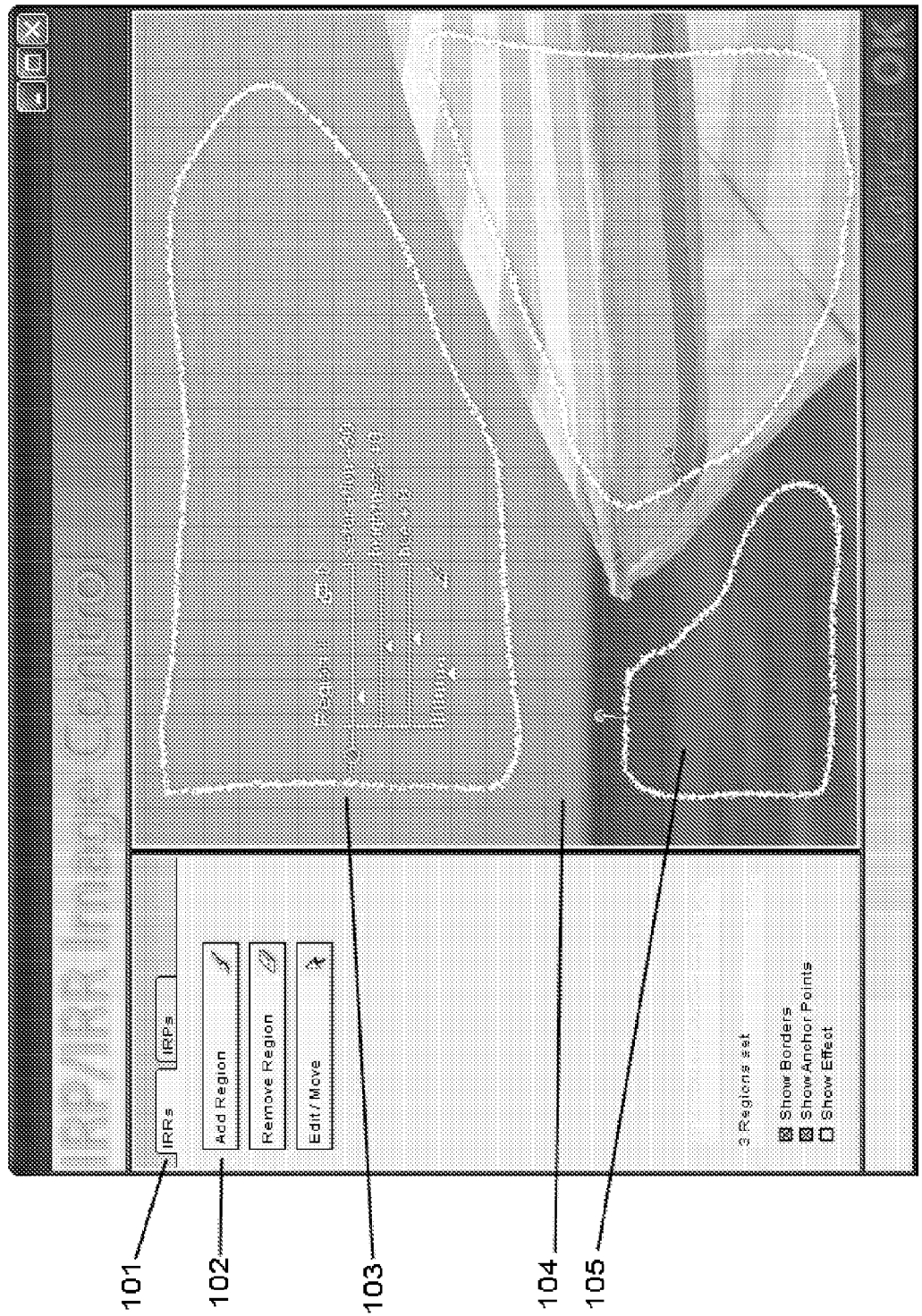
FIG. 6 shows one possible application that allows for image editing using IRPs and IRRs.

FIG. 6 shows one possible application that allows for image editing using IRPs and IRRs. Tab 101 illustrates a means for switching between IRP tools and IRR tools. Note that IRPs and IRRs can coexist on one image (not shown here). Buttons 102 shows buttons that allow the user to create, remove, erase or move regions. Region 103 shows a region with connected sliders, see FIG. 7 for details. Area 104 shows a part of the image that is "outside" the user-drawn region boundaries. Here, the image enhancements of the IRRs and IRPs will be blended into the image using a mixing function. Region 105 indicates the interior of an IRR, where the effect associated with that region will be applied at 100% or almost 100% weight.

Figure 7:
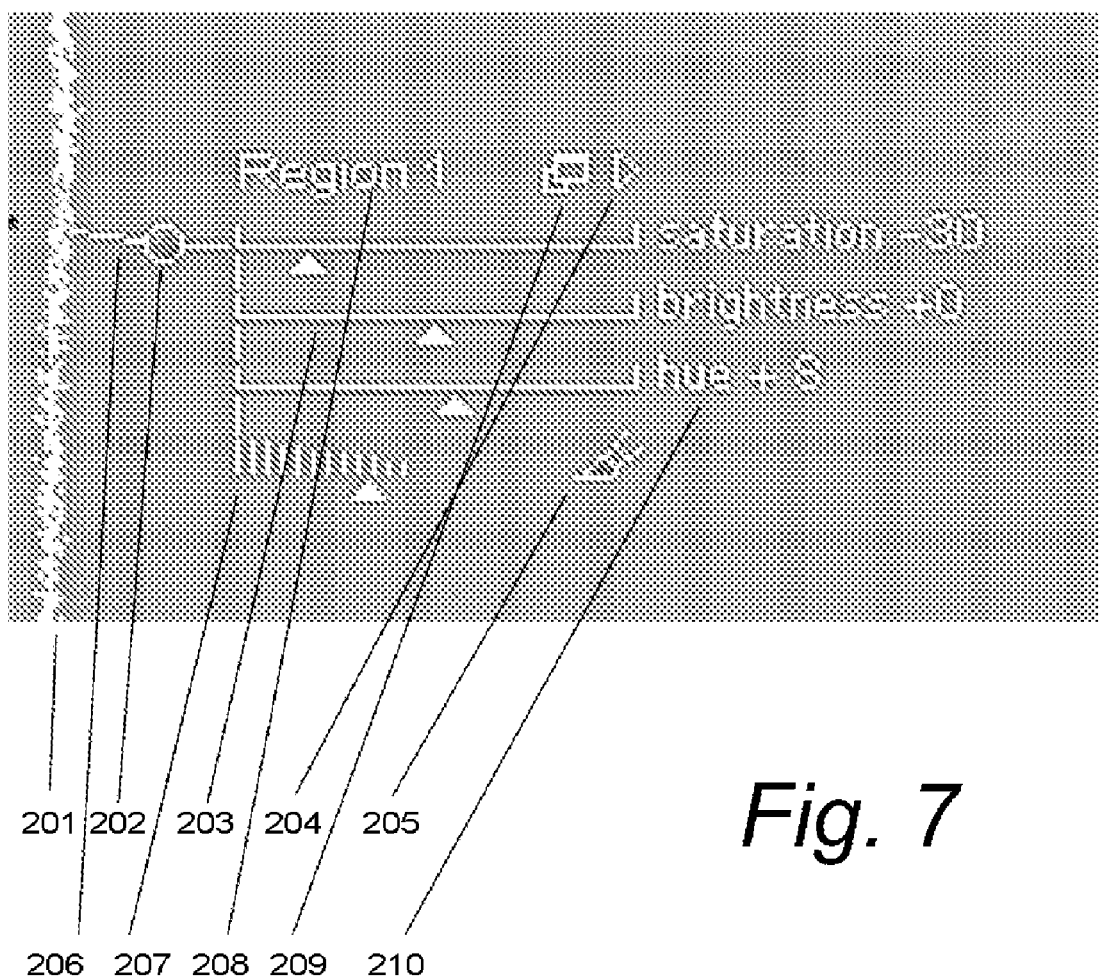
FIG. 7 is an enlarged portion of area 103 of FIG. 6.

The right part of FIG. 6 shows the preview area, which would by default display a preview of the result and which could be scrollable and have other features known in image editing applications. An implementation could also automatically highlight the one or more IRPs or IRRs that influence the pixel that the user's pointing device is currently over (a mixing function will directly provide this information), so that the user can identify or activate the user interfaces of IRPs or IRRs via the image. FIG. 7 shows one possible implementation of the user control elements associated with a region. Region boundary 201 illustrates the border of the region, see FIG. 6. Icon 202 represents a graphical icon that allows the user to grab, drag and relocate the user controls within the image, which would move the enhancement controls (202-205, 207-210) but not the region boundary 201. Note: An icon like icon 202 can also be used to display characteristics of the enhancement type via its color, or it can be used to allow the user to show or hide the enhancement controls via a click or a double click. Sliders 203 shows sliders representing parameters of an image enhancement, Icon 204 represents an icon representing a conventional context menu providing more features, button 205 represents a button that allows the user further editing of the region, connector 206 represent a flexible graphical connection between the region boundary and enhancement controls, and slider 207 represents a user control allowing the user to control the fuzziness (see "weight vector g" below) of the IRR. Title 208 illustrates a textual region description and icon 209 illustrates an icon that may allow the user to enlarge or shrink the interface, or to turn it into a resizable solid window, while descriptions 210 represents textual descriptions of the adjusted image enhancement parameters. The term "image enhancement" as used in this paragraph is understood as referring to the "Performing Function".

The Technical Implementation of IRRs:

As stated in Equation [1], an "IRP image modification" is defined as:

$$(F_{1...m}, R_{1...m}, I, A_{1...n}, D, V, C_{1...m})$$ [Equation 1 repeated]

As stated earlier, an area of interest can be associated with an IRP and the characteristics of a pixel can be derived from a plurality of pixels neighboring the pixel. This provides for basic region support, as then the distance function D will compare image pixels against the characteristics of a plurality of pixels neighboring the IRP pixel. However, the more complex such an area of interest becomes, and the higher the variance in the targeted region is, the less precision will be provided by this method. Therefore the following is advantageous:

Introducing M and C

Based on the processes described so far in this disclosure, two matrixes M and C can be added to provide for better region support. In equation 1, $R_{1...m}$ can be either IRPs or IRR, any combination is possible. In one preferred embodiment, if $R_i$ is an IRR, $R_i$ represents the user-defined margin, i.e., the slope or shape that the user sees on the screen.

In order to support the enhanced processing using M and C, we define now the distance between an image pixel and a series of margin pixels $R_i$:

Definition:

$$|R_i - I_{x,y}| = \|M_{n,x,y} * g_1 + (I_{x,y,r} - C_{x,y,r}) * g_2 + \ldots + (I_{x,y,b} - C_{x,y,b}) * g_4\|$$ [25]

where:

* is a scalar multiplication, not a matrix multiplication $\|\ldots\|$ is any norm, such as $\|\ldots\|_2$ $R_i$ is the i-th IRR $I_{x,y}$ is a pixel in the image I $M_n$ is an matrix the same size of I, see below $C_n$ is a matrix the same size of I, see below g is a weight vector as introduced in equation [14]

$g_1$ is here a position weight, and $g_2, g_3, g_4$ are weights for the three channels red, green and blue Note that after this definition, IRRs and IRPs can coexist in an image modification as defined in equation [1].

Note that the example above uses an RGB space with the colors red, green and blue, while other color spaces such as YCrCb may lead to better results.

Note that for even better results, the image I and the matrix C can be a multiple-channel-image, each channel representing one of the characteristics $A_{1...n}$. (Side-note: This would even work for position-dependent characteristics, but from a computational standpoint this wouldn't be wise).

Note that the matrixes $M_n$ and $C_n$ need to be calculated once for every region.

Calculation of M:

$M_{n,x,y}$ defines for every pixel a spatial distance between the given point x,y and the closest point along the margin of the region of the IRR $R_n$. Therefore, within $R_n$ is an IRR not an IRP:

$M_{n,x,y}=0$ if x,y is a coordinate of the margin of the region of $R_n$ $M_{n,x,y}>0$ if the point x,y lies outside the region $R_n$ $M_{n,x,y}=0$ if the point x,y lies inside the region $R_n$.

Alternatively, one may define that points lying inside the region all have distances smaller than zero.

This calculation can easily be done as described in literature. The best approach may be an algorithm providing the pseudo-Euclidean distance, for instance as implemented as "BWDIST" in MatLab. More information on such algorithms can be found in Breu, Heinz, Joseph Gil, David Kirkpatrick, and Michael Werman, "Linear Time Euclidean Distance Transform Algorithms," IEEE Transactions on Pattern Analysis and Machine Intelligence, Vol. 17, No. 5, May 1995, pp. 529-533.

An even faster approach is to create a matrix that is filled with zeros at the region of interest (IRR) and with ones everywhere else, and to apply a convolution kernel to this area, for instance a large radius Gaussian convolution kernel. The values of the convolved matrix can be used as a simple approximation for a distance of a pixel to the IRR.

Using such a convolution kernel has the advantage that there is a smooth gradient within M at the margin of $R_n$. This means that some adaptive nature of the Mixing Function will still show effect to both sides of the margin of the region. This will be helpful when regions touch very closely, such as in FIG. 10/811 or FIG. 11/817.

Calculation of C:

$C_{n,x,y}$ is achieved with an inpainting routine by defining the area lying outside the region $R_n$ as the area to be inpainted, while the area inside the region is the region with "correct" image pixels that are supposed to remain unchanged. In other words, the inpainting process inpaints the data outside the region as opposed to (what's normally done) inside the region. It is more an "outpainting" routine than an inpainting routine.

There is a large amount of literature on optimal inpainting, and most of the suggested algorithms will work for the creation of C, for example provided by Oliveira et al, "Fast Digital Image Inpainting", Proceedings of the International Conference of Visualization, VIIP 2001, Marbella, Spain, Sep. 3-5 2001, pp 261-266.

Figure 8:
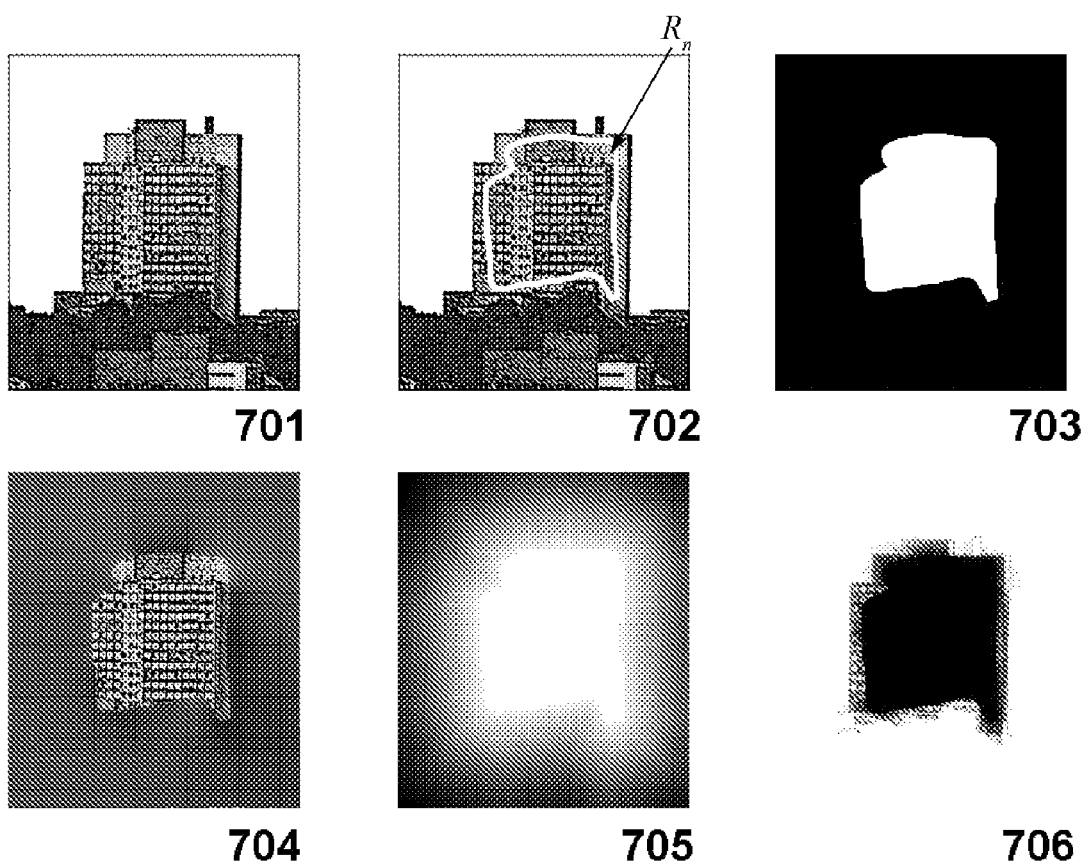
FIG. 8 shows a series of images illustrating selection of a region.
Figure 9:
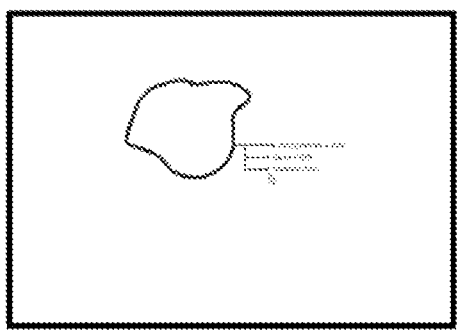
FIGS. 9 through 11 show additional embodiments of regions according to the invention.
Figure 9:
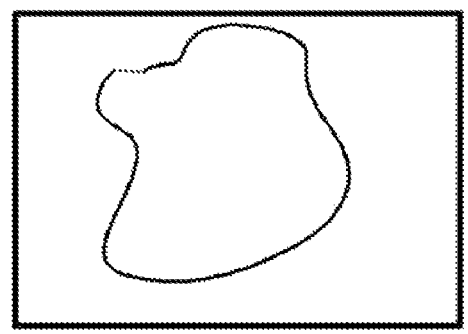
Figure 9:
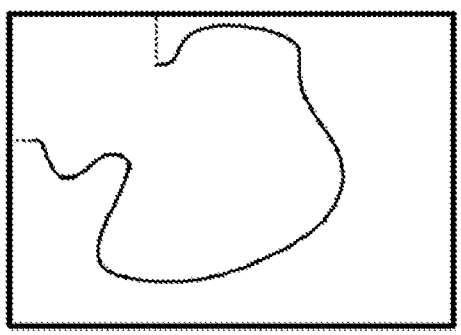
Figure 9:
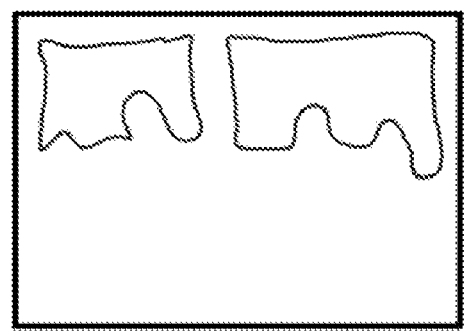
Figure 9:
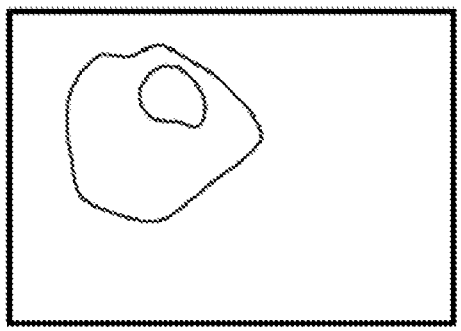
Figure 9:
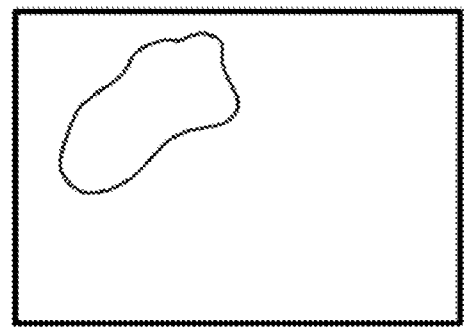
Figure 9:
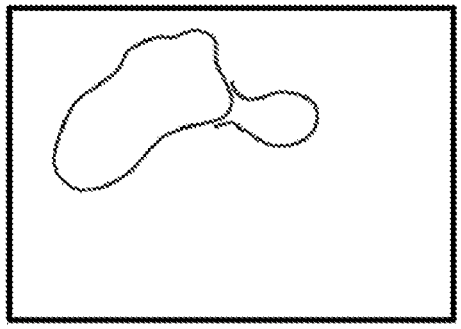
Figure 9:
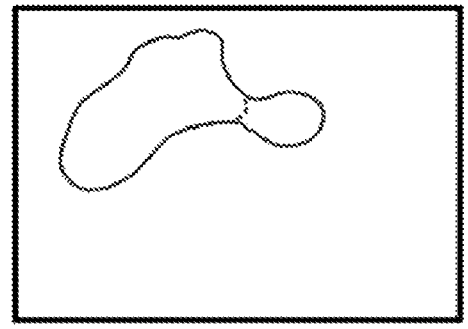

With reference to FIG. 8, illustration 701 shows an image, while illustration 702 shows a user-defined region $R_n$ lying over the image. Obviously, the user's intent is to select the house. Illustration 703 shows the mask that is based on the user-defined region. Illustration 704 shows the matrix $C_n$, where the pixels outside the area of $R_n$ were filled in using an inpainting algorithm. Illustration 705 shows $M_n$, where white pixels represent zero distances and darker pixels represent higher distances. A pseudo-Euclidean distance routine was used here. Image 706 shows the resulting mask as it may be created using equation [21] or [22]. The fuzzy margin is a wanted effect; if the user wants to prevent the mask from reaching into the sky then he has to use a second IRP or an IRR to constrain the sky from receiving an image modification.

The results can be enhanced by applying a median filter to the pixels of the margin before calculating C. (i.e., if the margin has a width of one pixel, a one-dimensional median is needed). This would ensure that little imperfections would not affect the result. For instance, if a region is drawn on a sky and accidentally the line is drawn over a little branch, then the median filter would avoid artifacts in the result.

While other image editing applications provide a means to make selections "smooth" or "feathered", the provided invention even allows systems where the user can differentiate between different featherings via different weights. For instance, if a first slider (for instance named "selection smoothness") is used to control position dependent weights (such as $g_1$ in equation 25) is implemented, along with a second slider (for instance "detail adaptation strength") that is used to control the other weights, the user has control over a normal smoothing of the effect of an IRR as well as a detail-dependent smoothing strength of an IRR (same for IRPs as discussed earlier).

Figure 12:
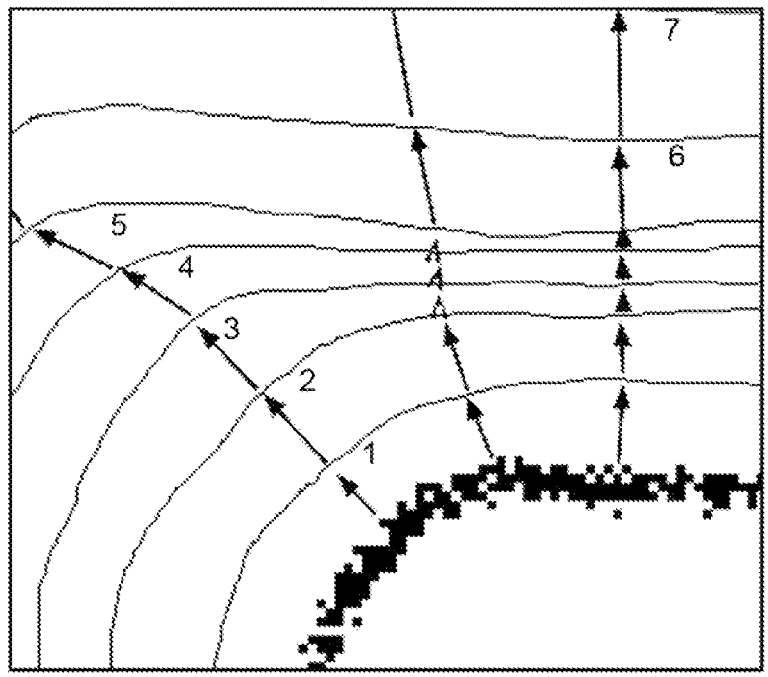
FIG. 12 illustrates a method of differential geometry that can be used to define a user-set boundary.

Other methods to calculate $|R_i-I_{x,y}|$ will be evident to those of skill in the art. For instance, a method of differential geometry can be used that defines the user-set boundary of an IRR as a 2D-curve, this curve being smooth and having normal vectors. This curve can be propagated from the region boundary into the image by shifting the curve along its normals into the image while using a high propagation speed for plain areas and using a low propagation speed for contrasty areas or edges. Then $|R_i-I_{x,y}|$ is defined as the number of propagation cycles it took to expand a 2D curve from $R_i$ until the pixel $I_{x,y}$ was passed by a propagated curve. Such a series of curves are illustrated in FIG. 12.

Another method for calculating a colormetrical distance between a given color of a pixel and the colors contained within a region is to create three histograms $h_r$, $h_g$, and $h_b$ for the pixels in the region. Then a one-dimensional Gaussian filter can be applied to the histograms. Then the entries in the histogram at the location of the given pixel are a surprisingly good measure for the colormetrical distance between given pixel and region. One further refinement of this is to use Lab or YCrCb instead of RGB. One further refinement would be to calculate a three-dimensional histogram $h_{rgb}$ and to blur this volume histogram with a three-dimensional Gaussian filter or other convolution filter suitable for smoothing.

Additional Embodiments

Slider Positioning and Texts

Illustration 801 shows how sliders can be connected to one region and how floating text can be used to illustrate the slider purpose and the current slider value to the users.

Closing Open Lines

Illustration 802 shows a scenario in which the user has obviously tried to draw a closed line, but the two ends do not match entirely. The computer can then assist the user by connecting the two lines automatically, indicated by the dashed line.

Closing Open Lines to the Margin

Illustration 803 shows that the ends of such a curve can be connected to the image margin. It may be a good idea to prefer this method if the ends of the curve are closer to the margin than to one another.

Disjoint Region

Illustration 804 shows two closed lines in one image that represent one IRR. In other words, the regions do not have to be connected. In an application, the user could define multiple close lines to be one region by holding down a modifier key, for example. Many implementations for this are possible. Note that this is not to be confused with joint and disjoint selections, as described below.

Regions with Holes

Illustration 805 shows that regions with holes are also possible.

Easy Correction of a Part of a Region

Illustrations 806, 807 and 808 show a process how a user might correct a shape. Illustration 806 shows a region. Illustration 807 shows an additional line drawn by the user for correction purposes, the ends of which are close to the already existing region. Illustration 808 shows the corrected region, where new line is made part of the new region. This means of course that one part of the line of the original region needs to be omitted, indicated by the dashed line in 808.

Creating Regions with a Brush

Figure 10:
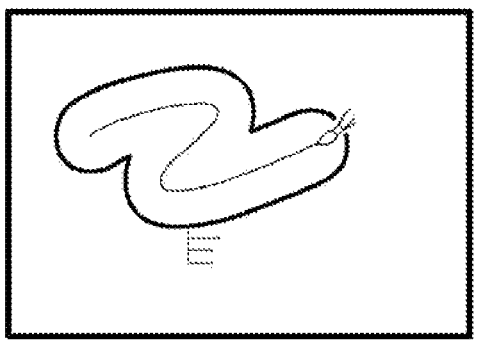
Figure 10:
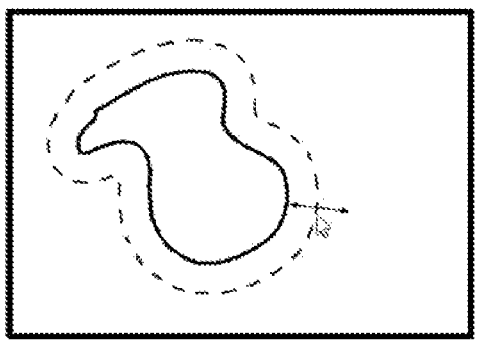
Figure 10:
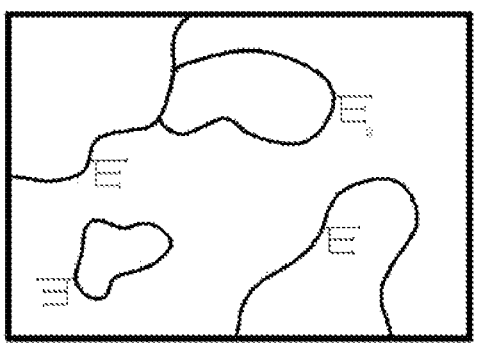
Figure 10:
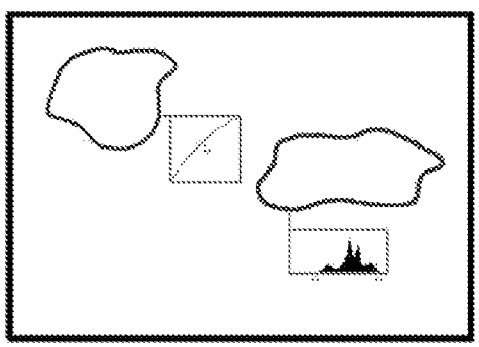
Figure 10:
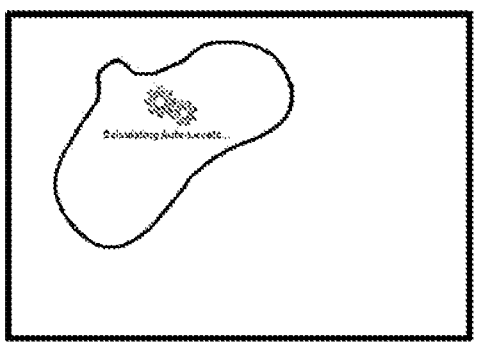
Figure 10:
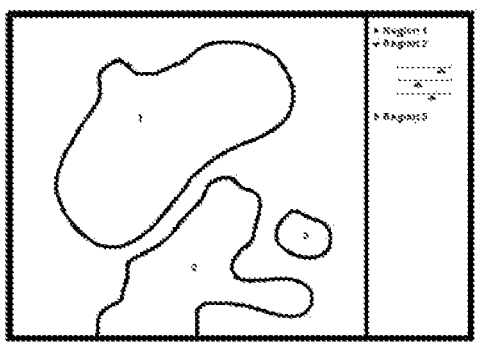
Figure 10:
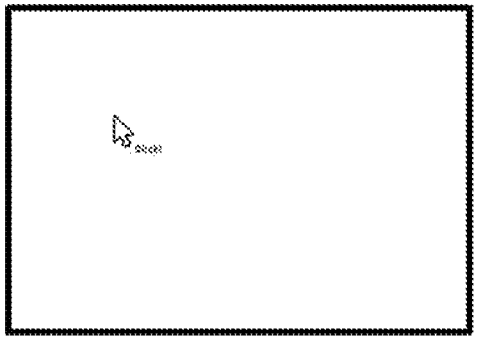
Figure 10:
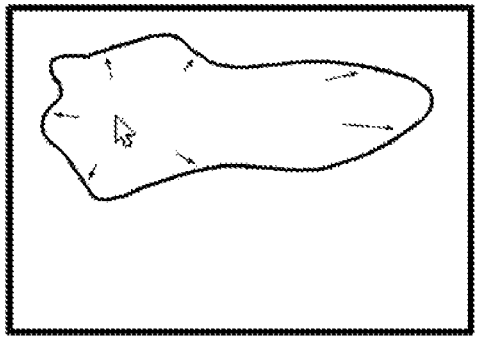

With respect to FIG. 10, Illustration 809 shows how a region can be created with a brush. The thin line in the middle indicates the path along which a user has performed a brush stroke, while the thick line indicates the margin of the resulting region. Note that in this example the brush is assumed to have a quite high width, also known as brush tip radius.

Note that when in equation [25] the weight vector has high weights for the matrix M and low or zero weights for the matrix C, the region will behave comparable to an ordinary brush stroke with a soft margin (or, relating to illustration 801, like a selection with a soft margin), while higher weights for C will bring out the adaptive nature of this region. But even when the weights for C are set to zero, the provided invention has strong benefits over current technologies, since the amount of necessary interaction (mouse clicks, mouse movement, eye movement, masking, selecting tools, selecting region of interest, etc.) is drastically minimized when the controls are spatially and graphically connected to the region of interest.

Fuzziness Control

Illustration 810 shows a region plus a second, dashed line around the region. This second line indicates the "reach" of a region, defining how far this region reaches into the image. Illustration 810 also indicates that this "reach" or "fuzziness" or "effect radius" as it may be called can be influenced by the user, for instance using a mouse. If the user modifies the broadness of the "reach" of the region, this will affect the internal variable g1, which is a weight for the matrix Mn.

Multiple Slider Positioning

Illustration 811 shows that in an image with many regions it may be a good idea to always position the sliders so that they do not overlap other regions. Therefore (or for other reasons) it may be wise to position the sliders so that they are positioned in some cases to the outside, in other cases to the inside of the region. It may even be allowed to the user that the sliders or image controls can be grabbed and repositioned with the mouse, while staying graphically connected to the region.

Advanced Region Controls

Illustration 812 shows that a region can have advanced controls, such as curves or histograms. Other controls suitable to allow user-input of image-editing parameters such as buttons, check boxes, text entry fields, etc., are also possible.

Filters that Process the Contents of a Region

Illustration 813 shows intelligent region processing. Since most IRRs will enclose many different colors and structures (as opposed to an IRP, which is typically positioned only on one color), it is possible to analyze the structure of the pixels enclosed in the IRR and to use these data to enhance the region. For instance, it is possible that an "Auto-Levels" routine can be applied via an IRR.

The routine of defining an IRR would then be as follows:
receive IRR region from user,
derive local statistics from region pixels,
display local statistics to user, and
receive image modification from user,
where the local statistics could be something like a histogram, average values, or the variance within the region. This will allow the user to modify local histograms. Another method would be:
receive IRR region from user,
receive user input, and
derive image modification from user input and local statistics.

For instance, in this case the user could use a slider named "spread histogram" reaching from 0% to 100%, and depending on the slider setting, the image modification would spread the histogram within the region (while the effect reaches outside of the region), without the user needing to actually see the histogram.

Off-Image Controls

Illustration 814 shows that the controls need not be positioned at the location of or superimposed over the regions, they can also be positioned to the side of the image or in a separate window. They can be associated with a certain region via a number, an icon, or by highlighting the region in the image the controls of which are currently being edited.

Auto-Region-Finding

Illustration 815 and 816 show that a region can also be suggested to the user by defining the region as that connected region of pixels that are similar (with a certain tolerance) to the pixel that the user clicked on. This means: the user just clicks on the image and the region expands automatically, so that the user then may have a good region already or at least a good starting point for further refining.

First Defining the Areas, then Adding Controls

Figure 11:
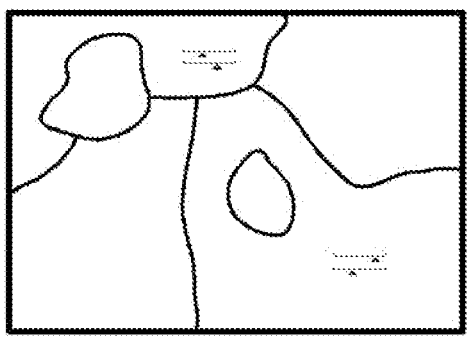
Figure 11:
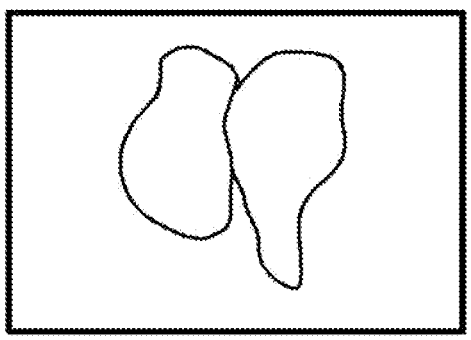
Figure 11:
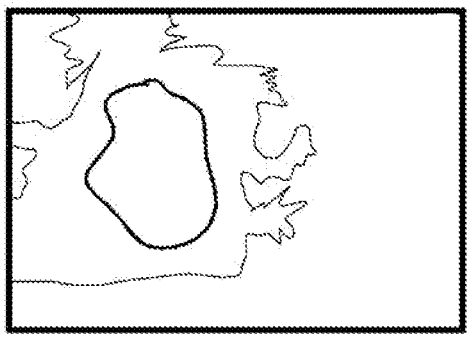
Figure 11:
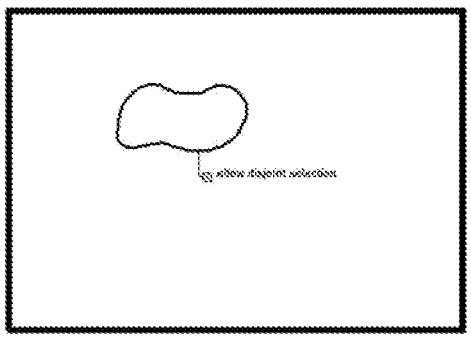
Figure 11:
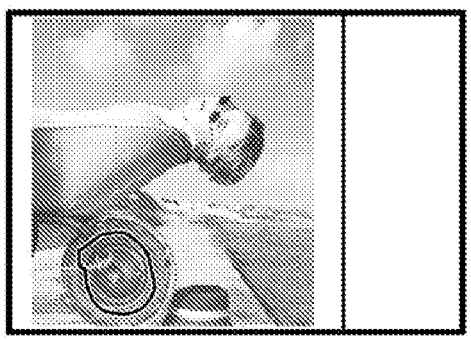
Figure 11:
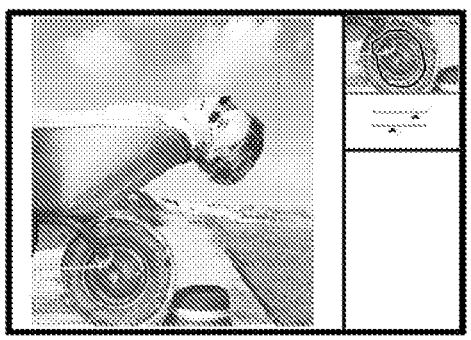
Figure 11:
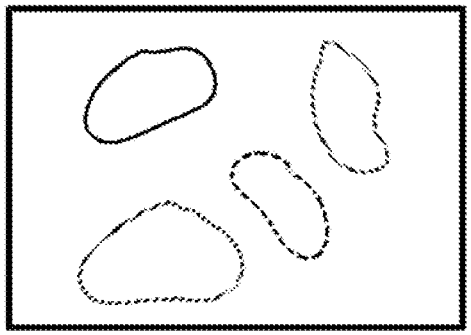
Figure 11:
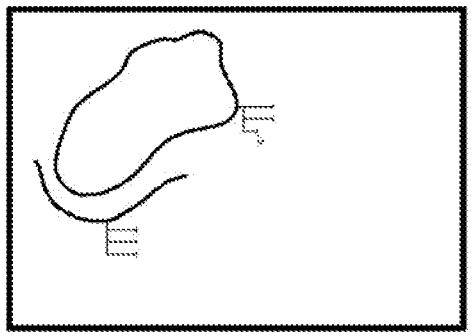

With respect to FIG. 11, Illustration 817 illustrates that a user may also want to follow a different workflow. He first may want to split up the image into various regions, and then in a second step the user can assign control operations to some or all of the regions. This would function with the same mathematical implementation, but it would allow a more flexible workflow for the user. In other words, the user would first draw separator lines into the image in order to roughly divide the image into regions, and then the user would apply changes, so that a mixing function determines the effect strength in the area of said separator lines. If the separator lines are thin, each distance matrix M can be calculated using a convolution kernel, as explained above.

Connected Areas

Illustration 818 shows that in some cases the regions can touch one another. This is already supported by the provided math. However, it may be desirable that—even although the regions touch—there is a smooth transition added to the area where the regions touch. This can for instance be done by applying a Gaussian blur to the matrixes Ma and Mb, where a,b represent the indices of the two IRRs Ra, Rb which touch. This blurring ensures that even with touching regions, some sort of smooth transition from one effect to the other can be achieved. In other words: This blurring ensures that the adaptive nature of a region does not only occur to the outside of a region, but also a bit towards the inside of a region. To achieve this effect even more, Ca and Cb can also be blurred.

Showing the Actual Area

Illustration 819 shows that in addition to the user-drawn region, the actually affected area can also be shown by showing a second line which denotes the margin in the pixels where the strength of the effect drops under a certain value.

Joint vs. Disjoint Selections

Illustration 820 shows that a checkbox can be associated with a region. With this checkbox, the user can define whether or not the user wants a joint vs. a disjoint selection. For instance, if the user paints a region into a sky above trees, the user certainly wants all small patches of sky that are visible between the trees also to be selected. This requires a disjoint selection. However, if the user wants to select just one flower within a field of many, he wants just a single joint selection for the flower, and no patches of selection to affect any pieces of other flowers. The user can adjust this with a checkbox.

This can be implemented with a simple algorithm. However, we first need to clarify the terms "joint" and "disjoint", since it is not clear what is meant by this when selections are not binary selections but masks with opacity values between, say, 0 and 255.

In our definition a joint mask is a mask that has no local maxima outside the boundary $R_n$ of the region, and it is disjoint otherwise.

With the mixing function process provided in this disclosure, selections in natural images will typically be disjoint under the given definition. So what is needed is an algorithm that takes the mask (that is, the intensity to which an effect is applied, see the term V(/Ri−Ixy/) in equation 22, for example) and removes unwanted local maxima.

Such an morphological algorithm for removing local maxima in a mask could look as follows:

10 Receive initial mask U1
20 Create image U2, set all pixels in U2 to zero, create Z={ }
30 m=maximal mask value within Rn in U1
40 add coordinates of all pixels of value m or higher in U1 to Z
50 For all coordinates in Z that are nonzero in U2 set U2 to m
60 If in U1 there are no adjacent pixels to Z with value >=m, set m=m−1
70 Add to Z coordinates of all pixel in U2 that are adjacent to Z and have a value of m or higher.
80 Go to 50.

Figure 13A:
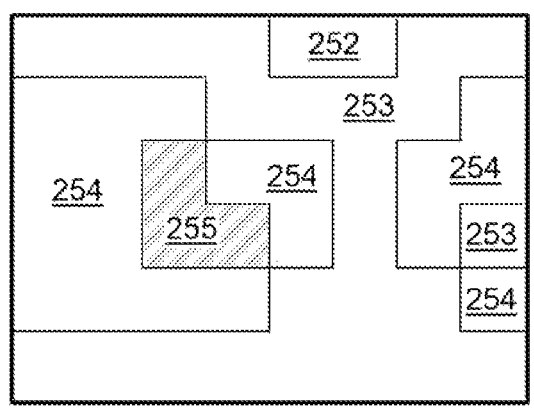
FIG. 13 illustrates a before-and-after comparison of removing local maxima from a non-binary mask.
Figure 13B:
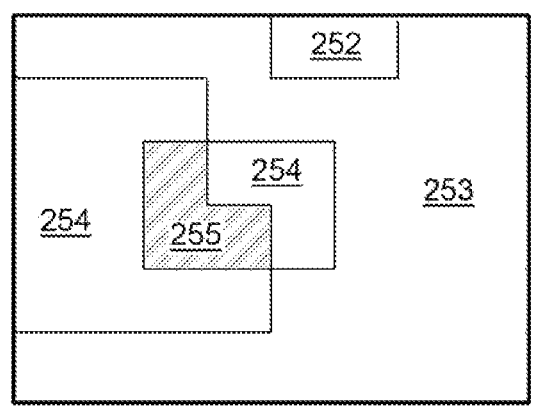

FIG. 13a shows such a mask U1 including local maxima (one with value 255 and two with values 254), while FIG. 13b shows such a mask U2 after the routine above was applied. As it can be seen, the shaded area of maximal value 255 is kept, while local maxima with value 254 to the right are eroded. This process removes isolated patches in the mask without creating a sharp discontinuity.

In a further embodiment the user can use conventional masking tools (such as a lasso, a brush) to blend between U1 and U2. In other words the user would have a tool that empowers him to remove disjoint patches in certain parts of the generated selection while leaving the selection disjoint in other areas. This may be helpful when for instance selecting an object that is fuzzy to its one side and clearly differentiated to its other side. Also, instead of a checkbox as shown in 820, a slider can be provided that would then blend uniformly between U1 and U2.

Non-Distracting Region Displaying

Illustrations 821 and 822 in FIG. 11 show how regions could be handled so that the line does not distract from the image. While the user can draw a line on the image representing a region, the line can for instance be hidden for the duration of editing, so that the user sees the full image while moving the sliders. In another embodiment, this can be supported by additionally showing an excerpt of the image showing a region in addition to the normal image preview. This can be done in another area of the main window, or in a floating palette, also often called "filter dialog window".

Colorizing the Region Margins

Illustration 823 shows that various regions can be shown in different colors or line styles. These colors or line styles can be user-defined, in case the user wants to set his own colors, may depend on the type of effect associated with a region, or may support the user in understanding what is one region and what are different regions (keep in mind that one region can consist of several closed lines).

Not Closed Regions

Illustration 824 displays a closed region and an "open region", i.e., a simple line. When the automatic closing of regions as suggested in illustrations 802 and 803 is not implemented, users could create such lines. These may be very helpful for targeting prolonged objects, such as the stem of a flower, and ensuring that the effect of a closed region is limited at one side. Note that illustration 824 shows a closed region with an effect (indicated by a slider moved by the mouse) while below the region there is a line with unmodified sliders. This could constrain the effect of the region from blending too much into the bottom part of the image.

Please note that the little "E-shaped" symbols in the illustrations are meant as a simplification of the controls shown in FIG. 7.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

This invention is not limited to particular hardware described herein, and any hardware presently existing or developed in the future that permits processing of digital images using the method disclosed can be used, including for example, a digital camera system.

A computer readable medium is provided having contents for causing a computer-based information handling system to perform the steps described herein, and to display the application program interface disclosed herein.

The term memory block refers to any possible computer-related image storage structure known to those skilled in the art, including but not limited to RAM, Processor Cache, Hard Drive, or combinations of those, including dynamic memory structures. Preferably, the methods and application program interface disclosed will be embodied in a computer program (not shown) either by coding in a high level language, or by preparing a filter which is complied and available as an adjunct to an image processing program. For example, in a preferred embodiment, the methods and application program interface is compiled into a plug-in filter that can operate within third party image processing programs such as Adobe Photoshop®.

Any currently existing or future developed computer readable medium suitable for storing data can be used to store the programs embodying the afore-described interface, methods and algorithms, including, but not limited to hard drives, floppy disks, digital tape, flash cards, compact discs, and DVDs. The computer readable medium can comprise more than one device, such as two linked hard drives. This invention is not limited to the particular hardware used herein, and any hardware presently existing or developed in the future that permits image processing can be used.

Any currently existing or future developed computer readable medium suitable for storing data can be used, including, but not limited to hard drives, floppy disks, digital tape, flash cards, compact discs, and DVDs. The computer readable medium can comprise more than one device, such as two linked hard drives, in communication with the processor.

A method for image processing of a digital image has disclosed comprising the steps of determining one or more sets of pixel characteristics; determining for each pixel characteristic set, an image editing function; providing a mixing function algorithm embodied on a computer-readable medium for modifying the digital image; and processing the digital image by applying the mixing function algorithm based on the one or more pixel characteristic sets and determined image editing functions. In one embodiment, the mixing function algorithm comprises a difference function. Optionally, the difference function algorithm calculates a value based on the difference of between pixel characteristics and one of the one or more determined pixel characteristic sets. In another embodiment, the mixing function algorithm includes a controlling function for normalizing the calculations.

In a further embodiment, the method adds the step of determining for each pixel characteristic set, a set of weighting values, and the processing step further comprises applying the mixing function algorithm based on the determined weighting value set.

In a further embodiment, a first pixel characteristic set is determined, and at least one characteristic in the first pixel characteristic set is location dependent, and at least one characteristic in the first pixel characteristic set is either color dependent, or structure dependent, or both. Alternatively, a first pixel characteristic set is determined, and at least two different characteristics in the first pixel characteristic set are from the group consisting of location dependent, color dependent, and structure dependent.

A method for processing of a digital image has been disclosed, comprising the steps of receiving the coordinates of one or more than one image reference point defined by a user within the digital image; receiving one or more than one image editing function assigned by the user and associated with the coordinates of the one or more than one defined image reference point; providing a mixing function algorithm embodied on a computer-readable medium for modifying the digital image; and processing the digital image by applying the mixing function algorithm based on the one or more than one assigned image editing function and the coordinates of the one or more than one defined image reference point. The method may optionally further comprise displaying a graphical icon at the coordinates of a defined image reference point.

A mixing function algorithm suitable to the invention has been described, and exemplar alternative embodiments are disclosed, including a group consisting of a Pythagoras distance approach which calculates a geometric distance between each pixel of the digital image to the coordinates of the one or more than one defined image reference point, a color curves approach, a segmentation approach, a classification approach, an expanding areas approach, and an offset vector approach. Optionally, the segmentation approach comprises multiple segmentation, and additionally optionally the classification approach adjusts for similarity of pixel attributes. The mixing function algorithm may optionally operate as a function of the calculated geometric distance from each pixel of the digital image to the coordinates of the defined image reference points.

Optionally, the disclosed method further comprises receiving one or more assigned image characteristics associated with the coordinates of a defined image reference point, and wherein the mixing function algorithm calculates a characteristic difference between the image characteristics of a pixel of the digital image and the assigned image characteristics. The mixing function algorithm may also calculate a characteristic difference between the image characteristics of a pixel and the image characteristics of one or more pixels neighboring the coordinates of one or more defined image reference point.

Additionally, optionally other steps may be added to the method. For example, the method may further comprise receiving one or more weighting values, and the processing step further comprising applying the mixing function algorithm based on weighting values; or further comprise receiving one or more regions of interest associated with the coordinates of one or more defined image reference point; or further comprise the step of providing an application program interface comprising a first interface to receive the coordinates of the one or more defined image reference points, and a second interface to receive the one or more assigned image editing functions.

A method for processing of a digital image comprising pixels having image characteristics has been disclosed comprising the steps defining the location of image reference points within the digital image; determining image editing functions; and processing the digital image by applying the determined image editing functions based upon either the location of the defined image reference points, or the image characteristics of the pixels at the location of the defined image reference points, or both.

A method for image processing of a digital image has also been disclosed comprising the steps of providing one or more than one image processing filter; setting the coordinates of one or more than one image reference point within the digital image; providing a mixing function algorithm embodied on a computer-readable medium for modifying the digital image; and processing the digital image by applying the mixing algorithm based on the one or more than one image processing filter and the coordinates of the one or more than one set image reference point. Optionally, various filters may be used, including but not limited to a noise reduction filter, a sharpening filter, or a color change filter.

Also, any element in a claim that does not explicitly state "means for" performing a specified function or "step for" performing a specified function, should not be interpreted as a "means" or "step" clause as specified in 35 U.S.C. § 112.

The invention claimed is:

1. A method for image processing of a digital image, the method comprising:
   a. defining a region of interest in the digital image;
   b. determining one or more sets of pixel characteristics for the region of interest;
   c. determining for each pixel characteristic set, an image editing function;
   d. providing a mixing function algorithm embodied on a computer-readable medium for modifying the digital image; and
   e. processing the digital image by applying the mixing function algorithm based on the one or more sets of pixel characteristics and the determined image editing function.

2. The method according to claim 1, wherein:
   a. the digital image includes pixels that are outside of the region of interest; and
   b. the step of processing the digital image includes using the mixing function to determine which pixels that are outside of the region of interest are affected by the determined image editing function.

3. The method according to claim 2, wherein:
   a. the digital image includes pixels that are included in the region of interest;
   b. during the step of processing the digital image, the pixels that are outside of the region of interest and which are spatially and colormetrically more similar to the pixels in the region of interest are affected to a greater extent by the determined image editing function.

4. The method according to claim 1, wherein:
   a. the digital image includes pixels that are outside of the region of interest;

b. the digital image includes pixels that are in the region of interest; and c. the step of processing the digital image includes applying an out-painting routine to the pixels that are outside of the region of interest.

5. The method according to claim 1, wherein the image editing function is selected from the group consisting of a darkening function, a brightening function, and a saturation altering function.

6. The method according to claim 1, wherein:

a. the digital image includes pixels that are outside of the region of interest;

b. the step of processing the digital image includes creating a matrix that includes a plurality of spatial distances and a plurality of pixel characteristic differences;

c. each of the plurality of spatial distances is a spatial distance between a pixel that is outside of the region of interest and the region of interest; and d. each of the plurality of pixel characteristic differences is a difference in pixel characteristic between a pixel that is outside of the region of interest and the region of interest.

7. The method according to claim 1, wherein:

a. the digital image includes one or more defined image reference points having coordinates; and b. the region of interest is associated with the coordinates of the one or more defined image reference points.

8. The method according to claim 1, wherein a control element is associated with the region of interest.

9. The method according to claim 8, wherein the control element is selected from the group consisting of a slider, a button, a checkbox, a text-entry field, a lasso tool, a brush, and a curve.

10. The method according to claim 8, wherein:

a. a floating text element is associated with the control element; and b. the floating text element includes information selected from the group consisting of a purpose of the control element and a value of the control element.

11. The method according to claim 8, wherein:

a. the control element has a location relative to the region of interest; and b. the location of the control element is definable by a user or a computer program that is embodied in a computer-readable medium.

12. The method according to claim 8, wherein:

a. the digital image has a side;

b. the digital image is located within a window on a screen; and c. the control element is in a position selected from the group consisting of adjacent to the side of the digital image, and in a window other than the window in which the digital image is located.

13. The method according to claim 8, wherein the control element is visually associated with the region of interest using an identifier selected from the group consisting of an icon, a number, and a highlighted region on the digital image.

14. The method according to claim 1, wherein:

a. the region of interest has a shape and a location in the digital image;

b. the shape and the location of the region of interest in the digital image is definable by a user; and c. if the user has not defined the region of interest to have a closed shape, a computer program that is embodied in a computer-readable medium is configured to add one or more lines to the user-defined region of interest so the region of interest has a closed shape.

15. The method according to claim 1, wherein:

a. the digital image has a margin;

b. the region of interest has a shape; and c. the shape of the region of interest is at least partially defined by the digital image's margin.

16. The method according to claim 1, wherein the step of defining a region of interest in the digital includes defining at least two separate regions of interest in the digital image.

17. The method according to claim 1, wherein:

a. the region of interest has a shape; and b. the shape of the region of interest can be changed after the region of interest is defined.

18. The method according to claim 1, wherein a user implements the step of defining a region of interest using a brush stroke that is applied to the digital image.

19. The method according to claim 1, wherein:

a. the region of interest has a shape;

b. the shape of the region of interest is defined by a first line on the digital image; and c. the region of interest has associated with it an effect radius that:

i. extends away from the region of interest, ii. forms a radius effect shape as a result of the shape of the region of interest; and iii. the radius effect shape is defined by a second line on the digital image that shows where an effect that is associated with the effect radius drops below a predetermined value.

20. The method according to claim 19, wherein a user can change the effect radius.

21. The method according to claim 1, wherein:

a. the digital image is displayed on a monitor;

b. a computer program that is embodied in a computer-readable medium is configured to derive a local statistic based on the pixels that are included in the region of interest; and c. the computer program is configured to prompt the display of the local statistics on the monitor for viewing by a user.

22. The method according to claim 21, wherein the local statistic is selected from the group consisting of a histogram, an average value, and a variance.

23. The method according to claim 21, wherein a user can modify the local statistic resulting in a modification of the pixel characteristics for pixels in the digital image.

24. The method according to claim 1, wherein:

a. the step of defining the region of interest in the digital image is performed by a computer program that is embodied in a computer-readable medium; and b. the computer program is configured to define the region of interest based on a determination of a region of pixels in the digital image that have characteristics that are similar to a pixel in the digital image that is selected by a user.

25. The method according to claim 1, wherein:

a. the step of defining a region of interest is implemented by a user subdividing the digital image into two or more regions of interest; and b. the user assigning a control element to one or more of the regions of interest.

26. The method according to claim 1, wherein:

a. the step of defining a region of interest in the digital image includes defining two or more regions of interest that are adjacent to one another in the digital image; and b. there is a smooth transition between the pixel characteristic for pixels in the digital image that are located near the two or more adjacent regions of interest.

27. The method according to claim 1, wherein:
a. the step of defining a region of interest in the digital image includes defining two or more regions of interest in the digital image;
b. each of the two or more regions of interest has associated with it a control element; and
c. the control element is configured to allow a user to remove the region of interest that is associated with the control element from the step of processing the digital image.

28. The method according to claim 1, wherein:
a. the image editing function has an effect strength value;
b. the step of determining for each pixel characteristic set an image editing function includes using a mask that is configured to determine the effect strength value;
c. the mask includes a local maxima; and
d. the process of determining for each pixel characteristic set an image editing function includes removing the local maxima from the mask.

29. The method according to claim 1, wherein:
a. the step of defining a region of interest includes defining two or more regions of interest in the digital image; and
b. the two or more regions of interest are distinguishable to a user because each of the two or more regions of interest has a unique identifier selected from the group consisting of a color and a line style.

30. The method according to claim 29, wherein the unique identifier is defined by a user.

31. The method according to claim 29, wherein the unique identifier is defined automatically by a computer program that is embodied in a computer-readable medium based on a type of image editing function that is performed on the region of interest.

32. The method according to claim 1, wherein the region of interest in the digital image is defined by a line.

33. The method according to claim 1, wherein the mixing function algorithm is selected from the group consisting of a Pythagoras distance approach that calculates a geometric distance, a color curves approach, a segmentation approach, a classification approach, a expanding areas approach, and an offset vector approach.

34. A method for processing a digital image comprising the steps of:
a. receiving coordinates for one or more than one regions of interest within the digital image;
b. receiving one or more than one image editing function that is associated with the one or more than one regions of interest;
c. providing a mixing function algorithm embodied on a computer-readable medium for modifying the digital image; and
d. processing the digital image by applying the mixing function algorithm based on the one or more than one image editing function and the coordinates of the one or more than one regions of interest.

* * * * *